(12) United States Patent
Guo

(10) Patent No.: US 12,272,139 B2
(45) Date of Patent: Apr. 8, 2025

(54) VIDEO LOOP RECOGNITION

(71) Applicant: Tencent Technology (Shenzhen) Company Limited, Guangdong (CN)

(72) Inventor: Hui Guo, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 336 days.

(21) Appl. No.: 18/071,234

(22) Filed: Nov. 29, 2022

(65) Prior Publication Data

US 2023/0093746 A1   Mar. 23, 2023

Related U.S. Application Data

(63) Continuation of application No. PCT/CN2022/092377, filed on May 12, 2022.

(30) Foreign Application Priority Data

Jun. 30, 2021   (CN) .......................... 202110731049.4

(51) Int. Cl.

| G06V 20/40 | (2022.01) |
|---|---|
| G06V 10/74 | (2022.01) |
| G06V 10/774 | (2022.01) |
| G06V 10/776 | (2022.01) |
| G06V 10/82 | (2022.01) |
| G10L 19/008 | (2013.01) |

(52) U.S. Cl.
CPC ............ *G06V 20/48* (2022.01); *G06V 10/761* (2022.01); *G06V 10/774* (2022.01);
(Continued)

(58) Field of Classification Search
CPC .. G06F 18/251; G06V 10/761; G06V 10/774; G06V 10/776; G06V 10/82; G06V 20/41;
(Continued)

(56) References Cited

U.S. PATENT DOCUMENTS

| 11,017,237 B1* | 5/2021 | Huang .................... G06N 5/022 |
| 2009/0103886 A1* | 4/2009 | Kataoka ................. H04H 60/59 |
| | | 386/248 |

FOREIGN PATENT DOCUMENTS

| CN | 101937506 A | 1/2011 |
| CN | 109389096 A | 2/2019 |

(Continued)

OTHER PUBLICATIONS

International Search Report and Written Opinion in PCT/CN2022/092377, mailed Jul. 27, 2022, 9 pages.
(Continued)

*Primary Examiner* — Michael J Vanchy, Jr.
(74) *Attorney, Agent, or Firm* — ArentFox Schiff LLP

(57) ABSTRACT

A method for video loop recognition includes determining a first encoding feature and a second encoding from a first video clip pair of a video. The first encoding feature is associated with first modal information, and the second encoding feature is associated with second modal information that is different from the first modal information. A network model that includes a first sequence model associated with the first modal information and a second sequence model associated with the second modal information is acquired. The method includes inputting the first encoding feature to the first sequence model that outputs a first similarity result, inputting the second encoding feature to the second sequence model that outputs a second similarity result, and obtaining a loop comparison result based on a comparison of the first similarity result with the second similarity result. The loop comparison result indicates a video type of the video.

20 Claims, 10 Drawing Sheets

(52) U.S. Cl.
CPC ............ *G06V 10/776* (2022.01); *G06V 10/82* (2022.01); *G06V 20/41* (2022.01); *G06V 20/46* (2022.01); *G06V 20/49* (2022.01); *G10L 19/008* (2013.01)

(58) Field of Classification Search
CPC ........ G06V 20/46; G06V 20/48; G06V 20/49; G10L 19/008; G10L 25/30; G10L 25/57
See application file for complete search history.

(56) References Cited

FOREIGN PATENT DOCUMENTS

| | | |
|---|---|---|
| CN | 109391825 A | 2/2019 |
| CN | 109977262 A | 7/2019 |
| CN | 111191075 A | 5/2020 |
| CN | 113177538 A | 7/2021 |
| WO | 2019241346 A1 | 12/2019 |

OTHER PUBLICATIONS

Cui et al., "Multi-grained encoding and joint embedding space fusion for video and text cross-modal retrieval", Multimedia Tools and applications., vol. 81, No. 24, XP093153493, May 30, 2022, pp. 34367-34386.

Extended European Search Report and Search Opinion received for European Application No. 22831455.5, mailed on May 28, 2024, 13 pages.

\* cited by examiner

VIDEO LOOP RECOGNITION

RELATED APPLICATIONS

The present application is a continuation of International Application No. PCT/CN2022/092377, entitled "VIDEO LOOP IDENTIFICATION METHOD AND DEVICE THEREOF, COMPUTER EQUIPMENT AND STORAGE MEDIUM" and filed on May 12, 2022, which claims priority to Chinese Patent Application No. 202110731049.4, entitled "VIDEO LOOP RECOGNITION METHOD AND APPARATUS, COMPUTER DEVICE, AND STORAGE MEDIUM" and filed on Jun. 30, 2021. The entire disclosures of the prior applications are hereby incorporated by reference in their entirety.

FIELD OF THE TECHNOLOGY

This application relates to the field of computer technologies, including video loop recognition.

BACKGROUND OF THE DISCLOSURE

Carousel recognition refers to video loop recognition of a video clip that is constantly duplicated, so as to improve video quality. If a related image recognition technology is applied to a process of video loop recognition, a computer device with an image recognition function, when extracting an image feature of each video frame of a to-be-recognized video, may match the image feature of each video frame with image features of subsequent video frames frame by frame, so as to determine duplicate video clips according to a quantitative proportion of counted duplicate frames.

However, once the video loop recognition is performed based on the quantitative proportion of the counted duplicate frames, the computer device may mistakenly determine duplicate video frames with irregular relations to be loop video frames, so that video clipping and other application scenarios are not supported.

SUMMARY

Embodiments of this disclosure provide a video loop recognition method and apparatus, a computer device, and a storage medium, which can improve accuracy of video loop recognition.

Some aspects of the disclosure provide a method for video loop recognition. The method includes, acquiring a first video clip pair from a video. The first video clip pair includes a first video clip and a second video clip from the video. The method includes determining a first encoding feature from the first video clip pair. The first encoding feature is associated with first modal information. The method includes determining a second encoding feature from the first video clip pair. The second encoding feature is associated with second modal information that is different from the first modal information. The method includes acquiring a network model that performs a loop recognition on the video. The network model includes a first sequence model associated with the first modal information and a second sequence model associated with the second modal information. The method includes inputting the first encoding feature to the first sequence model that outputs a first similarity result for the first video clip pair, inputting the second encoding feature to the second sequence model that outputs a second similarity result for the first video clip pair, and obtain a loop comparison result of the first video clip pair based on a comparison of the first similarity result with the second similarity result. The loop comparison result indicates a video type for the video.

Some aspects of the disclosure provide an apparatus for video loop recognition, the apparatus includes processing circuitry. The processing circuitry acquires a first video clip pair from a video, the first video clip pair includes a first video clip and a second video clip from the video. The processing circuitry determines a first encoding feature from the first video clip pair, the first encoding feature is associated with first modal information. The processing circuitry determines a second encoding feature from the first video clip pair, the second encoding feature is associated with second modal information that is different from the first modal information. The processing circuitry acquires a network model that performs a loop recognition on the video, the network model includes a first sequence model associated with the first modal information and a second sequence model associated with the second modal information. The processing circuitry inputs the first encoding feature to the first sequence model that outputs a first similarity result for the first video clip pair, inputs the second encoding feature to the second sequence model that outputs a second similarity result for the first video clip pair; and obtains a loop comparison result of the first video clip pair based on a comparison of the first similarity result with the second similarity result, the loop comparison result indicates a video type for the video.

An aspect of this disclosure provides a computer device, comprising: a processor and a memory. The processor is connected to the memory. The memory is configured to store a computer program, the computer program, when executed by the processor, causing the computer device to perform the method according to the foregoing aspects.

An aspect of the embodiments of this disclosure provides a computer-readable storage medium, storing a computer program, the computer program being loaded and executed by a processor, to cause a computer device having the processor to perform the method according to the foregoing aspects.

An aspect of the embodiments of this disclosure provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the method according to the foregoing aspects.

In an embodiment of this disclosure, the computer device, when performing loop recognition on a to-be-recognized video, may acquire a target video clip pair of the to-be-recognized video in advance, and determine a first target encoding feature and a second target encoding feature of the target video clip pair. Herein, first modal information (e.g., video modal information) corresponding to the first target encoding feature is different from second modal information (e.g., audio modal information) corresponding to the second target encoding feature. The computer device, when acquiring a target network model for performing loop recognition on the to-be-recognized video, may make full use of video information of the target video clip pair, that is, may determine a first target similar result of the target video clip pair under the first modal information through a first target sequence model in the target network model, and may also determine a second target similar result of the target video clip pair under the second modal information through a second target sequence model in the target network model. Further, the computer device may compare the first target similar result with the second target similar result to more accurately obtain a loop comparison result of the target video clip pair, so as to improve the accuracy of video loop recognition.

DESCRIPTION OF EMBODIMENTS

The technical solutions in the embodiments of this disclosure are described below with reference to the accompanying drawings in the embodiments of this disclosure. The described embodiments are merely some rather than all of the embodiments of this disclosure.

Figure 1:
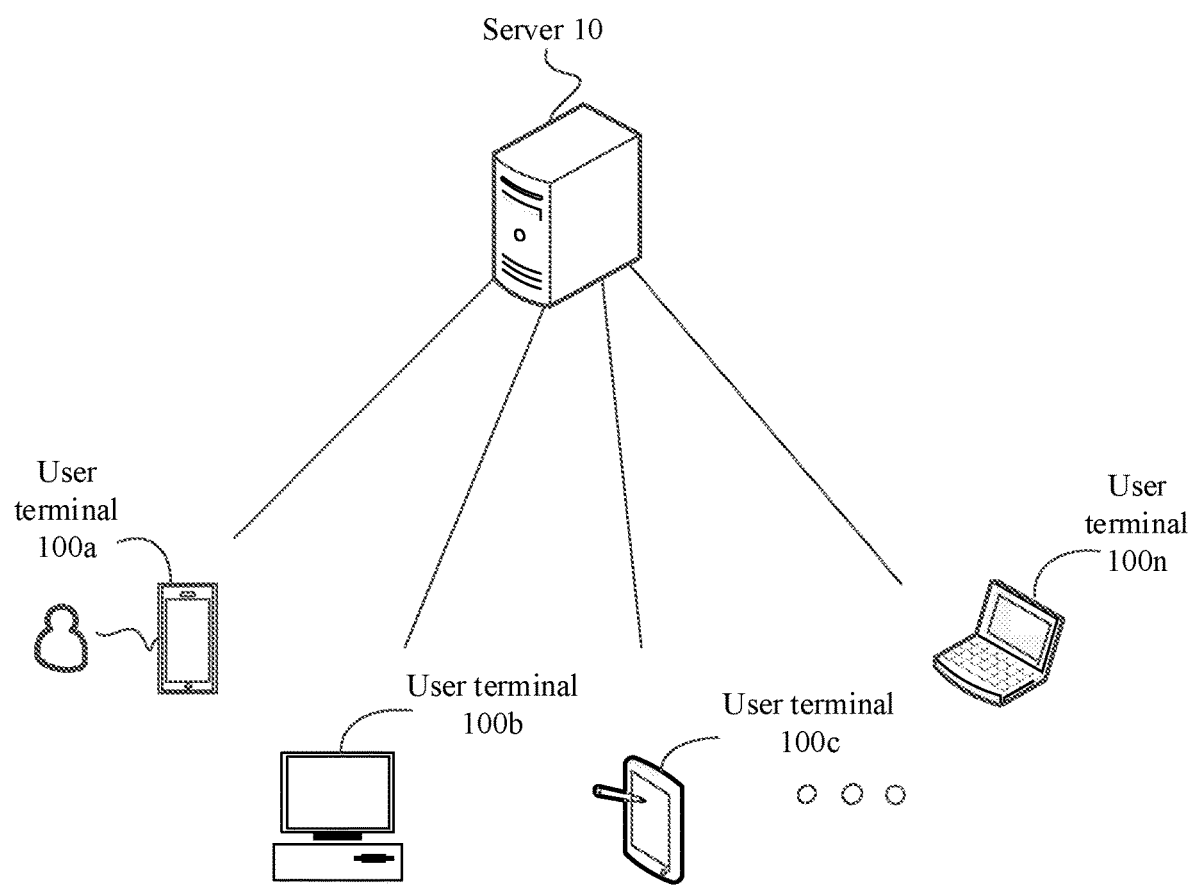
FIG. 1 is a schematic structural diagram of a network architecture according to an embodiment of this disclosure.

Referring to FIG. 1, FIG. 1 is a schematic structural diagram of a network architecture according to an embodiment of this disclosure. As shown in FIG. 1, the network architecture may include a server 10 and a user terminal cluster. The user terminal cluster may include one or more user terminals. As shown in FIG. 1, the user terminal cluster may specifically include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may each establish a network connection to the server 10, so that each user terminal can exchange data with the server 10 through the network connection. Herein, the network connection is not limited by connection manners, which may be direct or indirection connection through wired communication, direct or indirection connection through wireless communication, or in other manners, which is not limited herein in this disclosure.

Each user terminal in the user terminal cluster may include: intelligent terminals with a video loop recognition function such as a smart phone, a tablet computer, a laptop computer, a desktop computer, a smart speaker, a smart watch, a vehicle-mounted terminal, and a smart TV. It should be understood that, as shown in FIG. 1, each user terminal in the user terminal cluster may each be installed with a target application. When running in the user terminals, the target application may exchange data with the server 10 shown in FIG. 1 respectively. The application client may include a social client, a multimedia client (e.g., a video client), an entertainment client (e.g., a game client), an education client, a live broadcast client, and the like. The application client may be a standalone client or an embedded sub-client integrated in a client (such as a social client, an educational client, or a multimedia client), which is not limited herein.

As shown in FIG. 1, the server 10 in an embodiment of this disclosure may be a server corresponding to the application client. The server 10 may be an independent physical server, or may be a server cluster composed of a plurality of physical servers or a distributed system, and may further be a cloud server that provides cloud computing services. Quantities of the user terminal and the server are not limited in this disclosure.

For ease of understanding, in an embodiment of this disclosure, one user terminal may be selected from the plurality of user terminals shown in FIG. 1 as a target user terminal. For example, in an embodiment of this disclosure, the user terminal 100a shown in FIG. 1 may be used as the target user terminal. A target application (i.e., an application client) may be integrated in the target user terminal. In this case, the target user terminal may realize data exchange with the server 10 through a service data platform corresponding to the application client. Herein, a trained target network model may be run in the target application. The target network model is a video pair loop recognition model based on multi-modal information. The target network model may be a neural network model for performing loop recognition on a to-be-recognized video. A video type of the to-be-recognized video may be predicted through a loop comparison result of the target network model. That is, it is determined whether the to-be-recognized video is a loop video to facilitate subsequent processing (such as moderation and interception).

It is to be understood that an embodiment of this disclosure proposes a video loop recognition method based on a target network model. The method may relate to machine learning in the field of artificial intelligence (AI). It is to be understood that, Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. The AI is to study the design principles and implementation methods of various intelligent machines, to enable the machines to have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. An AI software technology mainly comprises fields such as a CV technology, a speech processing technology, a natural language processing technology, machine learning/deep learning (DL), automatic driving, and intelligent transportation.

ML (Machine Learning) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and DL generally comprise technologies such as an artificial neural network, a belief network, reinforcement learning, transfer learning, inductive learning, and learning from demonstrations.

Since a video of a loop video type has poor video quality during video playback, in order to effectively improve the video quality, loop recognition on the video is required during video moderation. However, during comparison between different video frames, a video loop recognition scheme in the related art pays attention only to whether image features between the two image frames participating in the comparison match each other, but does not make full use of the entire video information, thereby reducing accuracy of video loop recognition.

It may be understood that the video information is very rich, which may include a variety of modal information such as video modal information, audio modal information, speech text modal information, video title modal information, and cover modal information. Video dimensions characterized by such modal information are all different. Therefore, in loop recognition on a video, an embodiment of this disclosure provides a video pair loop recognition model (i.e., a target network model) based on multi-modal information.

It may be understood that, in order to make full use of the multi-modal information of the video, the target network model as referred to in this disclosure may include a plurality of target sequence models (i.e., sequence similarity learning models) correlated with one piece of modal information, and one target sequence model is used for determining a target similar result (also referred to as a similarity result) of a target video clip pair under the corresponding modal information. For example, the target network model may include a target sequence model correlated with the video modal information (e.g., a target sequence model 1), a target sequence model correlated with the audio modal information (e.g., a target sequence model 2), a target sequence model correlated with the speech text modal information (e.g., a target sequence model 3), a target sequence model correlated with the video title modal information (e.g., a target sequence model 4), a target sequence model correlated with the cover modal information (e.g., a target sequence model 5), and the like.

For example, the above target network model may be run in a computer device with a video loop recognition function (e.g., the user terminal 100a shown in FIG. 1 or the server 10 shown in FIG. 1). For example, the target network model may include 2 target sequence models, which may specifically include a first target sequence model corresponding to first modal information (e.g., video modal information) and a second target sequence model corresponding to second modal information (e.g., audio modal information). It may be understood that the computer device, when performing loop recognition on a to-be-recognized video, may acquire a target video clip pair of the to-be-recognized video in advance, and determine a first target encoding feature and a second target encoding feature of the target video clip pair. The computer device, when acquiring the target network model, may make full use of video information of the target video clip pair, that is, may determine a first target similar result of the target video clip pair under the first modal information through the first target sequence model in the target network model, and may also determine a second target similar result of the target video clip pair under the second modal information through the second target sequence model in the target network model. Further, the computer device may compare the first target similar result with the second target similar result to more accurately obtain a loop comparison result of the target video clip pair, so as to improve the accuracy of video loop recognition.

Figure 2:
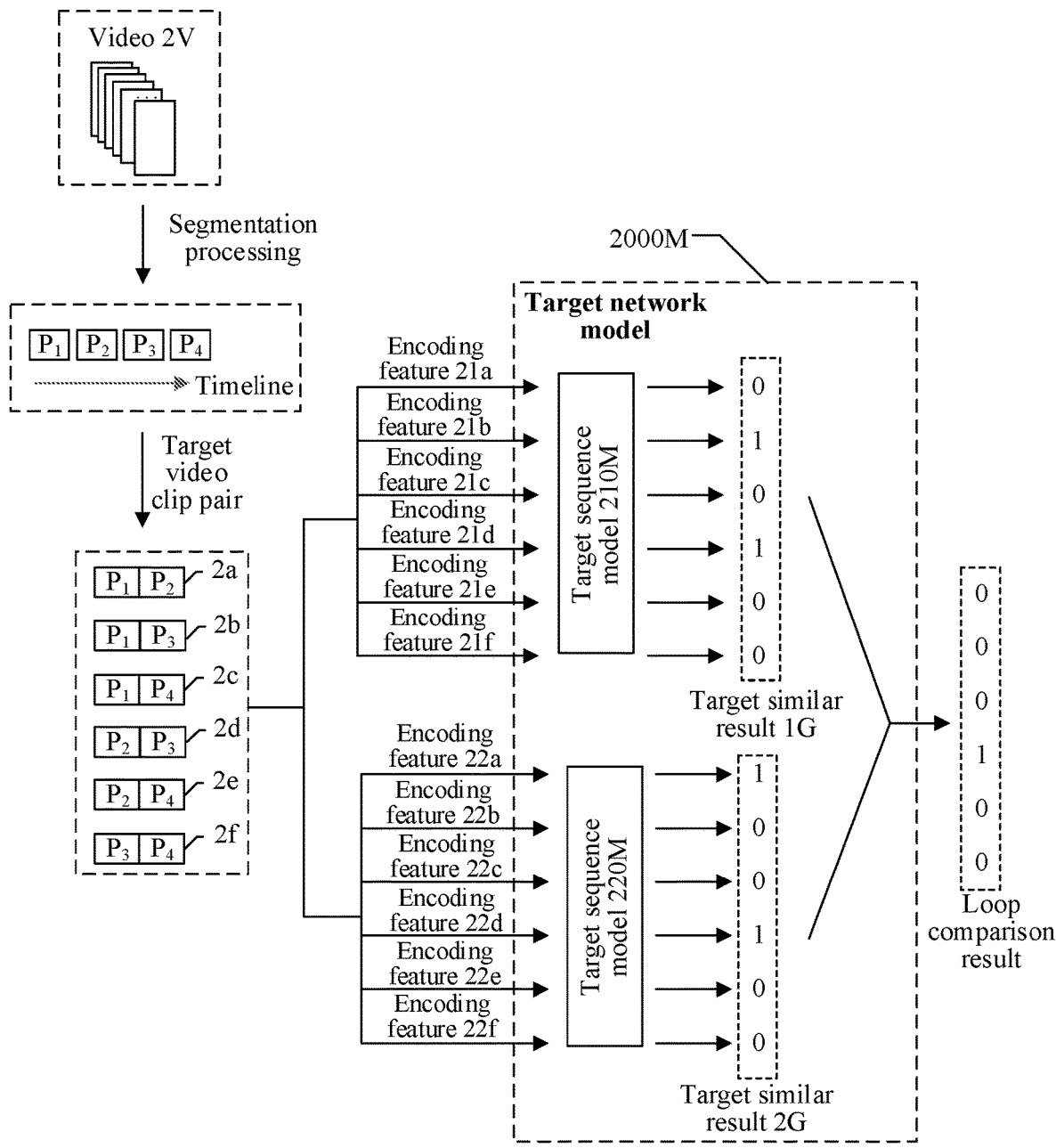
FIG. 2 is a model architecture diagram of a video pair loop recognition model based on multi-modal information according to an embodiment of this disclosure.

For ease of understanding, further referring to FIG. 2, FIG. 2 is a model architecture diagram of a video pair loop recognition model based on multi-modal information according to an embodiment of this disclosure. As shown in FIG. 2, the computer device in this disclosure may be a computer device with a video loop recognition function. The computer device may be any user terminal in the user terminal cluster shown in FIG. 1, for example, the user terminal 100a. The computer device may also be the server 10 shown in FIG. 1. The computer device is not limited herein.

The computer device in an embodiment of this disclosure, when acquiring a video 2V shown in FIG. 2, may take the video 2V as a to-be-recognized video to perform video moderation on the video 2V. The video 2V may be a video transmitted by a user terminal having a network connection relationship with the computer device. It is to be understood that the computer device, when acquiring the video 2V, may segment the video 2V to obtain N video clips, and then may determine a target video clip pair of the video 2V according to the N video clips. Herein, N is a positive integer.

For example, if a video duration of the video 2V shown in FIG. 2 is 20 s, the computer device may select a cutting interval (e.g., 5 s) to evenly slice the video 2V into 4 video clips. As shown in FIG. 2, the 4 video clips are arranged by timeline, which may sequentially include a video clip $P_1$, a video clip $P_2$, a video clip $P_3$, and a video clip $P_4$. Further, the computer device may randomly select two video clips from the 4 video clips to form the target video clip pair of the video 2V. The target video clip pair of the video 2V may specifically include: a target video clip pair formed by the video clip $P_1$ and the video clip $P_2$ (e.g., a video clip pair 2a), a target video clip pair formed by the video clip $P_1$ and the video clip $P_3$ (e.g., a video clip pair 2b), a target video clip pair formed by the video clip $P_1$ and the video clip $P_4$ (e.g., a video clip pair 2c), a target video clip pair formed by the video clip $P_2$ and the video clip $P_3$ (e.g., a video clip pair 2d), a target video clip pair formed by the video clip $P_2$ and the video clip $P_4$ (e.g., a video clip pair 2e), and a target video clip pair formed by the video clip $P_3$ and the video clip $P_4$ (e.g., a video clip pair 2f).

In order to improve the accuracy of video loop recognition, the computer device in an embodiment of this disclosure needs to make full use of multi-modal information of the target video clip pair. Therefore, the computer device may determine a target encoding feature of each target video clip pair. Herein, the target encoding feature may include an encoding feature of each target video clip pair under first modal information (i.e., a first target encoding feature) and an encoding feature under second modal information (i.e., a second target encoding feature). For example, the first modal information herein may be video modal information, and the second modal information herein may be audio modal information which is different from the first modal information. As shown in FIG. 2, the first target encoding feature of the video clip pair 2a may be an encoding feature 21a, and the second target encoding feature of the video clip pair 2a may be an encoding feature 22a. The first target encoding feature of the video clip pair 2b may be an encoding feature 21b, and the second target encoding feature of the video clip pair 2b may be an encoding feature 22b. By analogy, the first target encoding feature of the video clip pair 2f may be an encoding feature 21f, and the second target encoding feature of the video clip pair 2f may be an encoding feature 22f.

It may be understood that the target encoding feature of the video clip pair 2a may include the encoding feature 21a (e.g., a video encoding feature $S_1$ and a video encoding feature $S_2$) and the encoding feature 22a (e.g., an audio encoding feature $Y_1$ and an audio encoding feature $Y_2$). The video encoding feature $S_1$ refers to an encoding feature of the video clip $P_1$ in the video clip pair 2a under the first modal information, and the audio encoding feature $Y_1$ refers to an encoding feature of the video clip $P_1$ in the video clip pair 2a under the second modal information. The video encoding feature $S_2$ refers to an encoding feature of the video clip $P_2$ in the video clip pair 2a under the first modal information, and the audio encoding feature $Y_2$ refers to an encoding feature of the video clip $P_2$ in the video clip pair 2a under the second modal information.

Further, the computer device may acquire a target network model (e.g., a target network model 2000M shown in FIG. 2) for performing loop recognition on the to-be-recognized video. The target network model 2000M may include a target sequence model 210M (i.e., a first target sequence model) correlated with the first modal information and a target sequence model 220M (i.e., a second target sequence model) correlated with the second modal information. In an embodiment of this disclosure, a sequence representation learning layer in the target sequence model 210M (i.e., the first target sequence model) may be referred to as a first sequence representation learning layer, and a similarity measurement layer in the first target sequence model is referred to as a first similarity measurement layer. In an embodiment of this disclosure, a sequence representation learning layer in the target sequence model 220M (i.e., the second target sequence model) may be referred to as a second sequence representation learning layer, and a similarity measurement layer in the second target sequence model is referred to as a second similarity measurement layer.

It may be understood that the computer device may input the first target encoding feature of the target video clip pair to the target sequence model 210M, perform sequence feature learning on the first target encoding feature through the first sequence representation learning layer, and input a first target learning feature obtained after sequence feature learning to the first similarity measurement layer, and the first similarity measurement layer outputs a first target similar result (e.g., a target similar result 1G shown in FIG. 2) of the target video clip pair. A value "O" in the target similar result 1G may indicate that the target video clip pair is not similar under the first modal information, and a value "1" in the target similar result 1G may indicate that the target video clip pair is similar under the first modal information. At the same time, the computer device may input the second target encoding feature of the target video clip pair to the target sequence model 220M, perform sequence feature learning on the second target encoding feature through the second sequence representation learning layer, and input a second target learning feature obtained after sequence feature learning to the second similarity measurement layer, and the second similarity measurement layer outputs a second target similar result (e.g., a target similar result 2G shown in FIG. 2) of the target video clip pair. A value "O" in the target similar result 2G may indicate that the target video clip pair is not similar under the second modal information, and a value "1" in the target similar result 2G may indicate that the target video clip pair is similar under the second modal information. In this case, the computer device may compare the first target similar result with the second target similar result to obtain a loop comparison result of the target video clip pair.

For example, for the target video clip pair of the video clip pair 2a, the computer device may input the encoding feature 21a of the video clip pair 2a to the target sequence model 210M shown in FIG. 2, and output the first target similar result (e.g., a similar result with the value of "0") of the video clip pair 2a through the first sequence representation learning layer and the first similarity measurement layer in the target sequence model 210M, which means that the video clip pair 2a is not similar under the first modal information. At the same time, the computer device may also input the encoding feature 22a of the video clip pair 2a to the target sequence model 220M shown in FIG. 2, and output the second target similar result (e.g., a similar result with the value of "1") of the video clip pair 2a through the second sequence representation learning layer and the second similarity measurement layer in the target sequence model 220M, which means that the video clip pair 2a is similar under the second modal information. In this case, the computer device may compare the first target similar result of the video clip pair 2a with the second target similar result of the video clip pair 2a, so as to obtain a loop comparison result (e.g., a non-loop video result with the value of "0") of the video clip pair 2a, which means that two video clips in the video clip pair 2a are not duplicated.

In another example, for such a target video clip pair as the video clip pair 2d, the computer device may input the encoding feature 21d of the video clip pair 2d to the target sequence model 210M shown in FIG. 2, and output the first target similar result (e.g., a similar result with the value of "1") of the video clip pair 2d through the first sequence representation learning layer and the first similarity measurement layer in the target sequence model 210M, which means that the video clip pair 2d is similar under the first modal information. At the same time, the computer device may also input the encoding feature 22d of the video clip pair 2d to the target sequence model 220M shown in FIG. 2, and output the second target similar result (e.g., a similar result with the value of "1") of the video clip pair 2d through the second sequence representation learning layer and the second similarity measurement layer in the target sequence model 220M, which means that the video clip pair 2d is similar under the second modal information. In this case, the computer device may compare the first target similar result of the video clip pair 2d with the second target similar result of the video clip pair 2d, so as to obtain a loop comparison result (e.g., a loop video result with the value of "1") of the video clip pair 2d, which means that two video clips in the video clip pair 2d are duplicated with each other.

The loop comparison result of the target video clip pair may be used for indicating a video type of the to-be-recognized video. It may be understood that, if the loop comparison result shown in FIG. 2 does not include the loop video result with the value of "1", that is, includes only non-loop video results with the value of "0", the computer device may determine the video type of the video 2V to be a non-loop video type. In some examples, if the loop comparison result shown in FIG. 2 includes the loop video result with the value of "1", the computer device may directly determine the video type of the video 2V to be a loop video type.

As can be seen, the computer device in an embodiment of this disclosure, when performing loop recognition on the video 2V, may make full use of the multi-modal information of the target video clip pair of the video 2V, which not only needs to determine a first similar result of the target video clip pair of the video 2V through the target sequence model 210M correlated with the first modal information in the target network model 2000M, but also needs to determine a second similar result of the target video clip pair of the video 2V through the target sequence model 220M correlated with the second modal information in the target network model 2000M, and then may jointly determine the loop comparison result of the target video clip pair based on the first similar result and the second similar result of the target video clip pair, so as to determine the video type of the to-be-recognized video according to the loop comparison result, thereby improving the accuracy of video loop recognition.

A specific implementation in which the computer device with a video loop recognition function determines the loop comparison result of the target video clip pair through a video pair loop recognition model based on multi-modal information (i.e., the target network model) may be obtained with reference to embodiments corresponding to FIG. 3 to FIG. 8 below.

Figure 3:
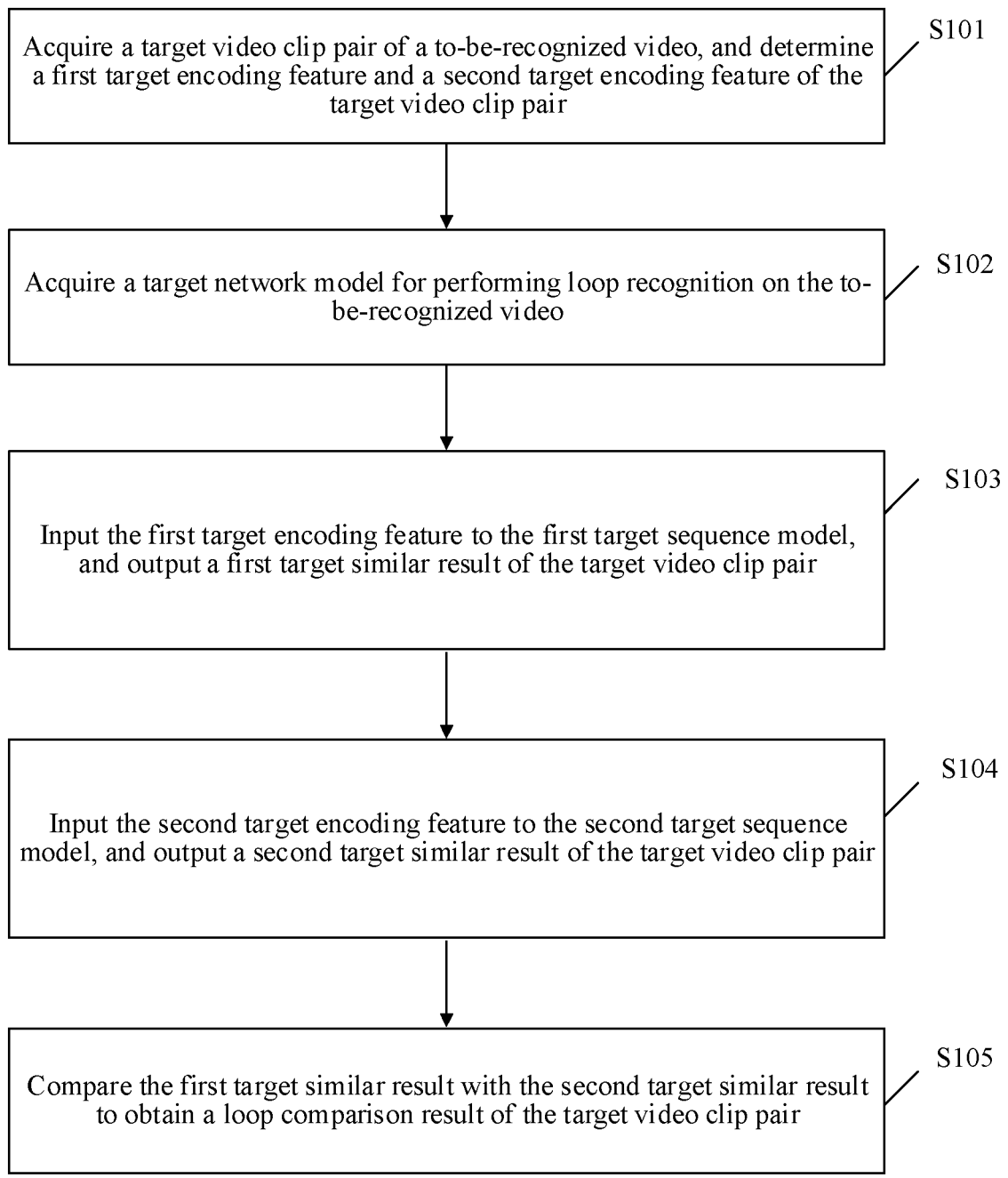
FIG. 3 is a schematic flowchart of a video loop recognition method according to an embodiment of this disclosure.

Further, referring to FIG. 3, FIG. 3 is a schematic flowchart of a video loop recognition method according to an embodiment of this disclosure. As shown in FIG. 3, the method may be performed by a computer device with a video loop recognition function. The computer device may be a user terminal (e.g., any user terminal in the user terminal cluster shown in FIG. 1, for example, the user terminal 100a with a model application function), or a server (e.g., the server 10 shown in FIG. 1), which is not limited herein. For ease of understanding, an embodiment of this disclosure is described with an example in which the method is performed by a server with a video loop recognition function. The method may include at least the following steps S101 to S105:

In step S101, a target video clip pair of a to-be-recognized video is acquired, and a first target encoding feature and a second target encoding feature of the target video clip pair are determined.

The to-be-recognized video is a video that needs loop video recognition. That is, there is a need to recognize whether a video type of the to-be-recognized video is a loop video type. The to-be-recognized video may be divided into a plurality of video clips. For example, different video clips involve different time intervals of the to-be-recognized video. At least one video clip pair may be formed based on the plurality of video clips. One video clip pair includes any two video clips among the plurality of video clips. The target video clip pair in this step is one of the at least one video clip pair.

Specifically, the computer device, when acquiring the to-be-recognized video, may segment the to-be-recognized video to obtain N video clips. Herein, N is a positive integer. Herein, the to-be-recognized video may be transmitted by a user terminal having a network connection relationship with the computer device, or captured by a user corresponding to the computer device through a camera component of the computer device, or clipped by a user corresponding to the computer device through an application client. The manner of acquiring the to-be-recognized video is not limited herein. Further, the computer device may acquire a video clip $P_i$ and a video clip $P_j$ from the N video clips, and take the video clip $P_i$ and the video clip $P_j$ as the target video clip pair of the to-be-recognized video. Herein, i and j are positive integers less than or equal to N, and i is not equal to j. Further, the computer device may perform first feature extraction on each video clip in the target video clip pair to obtain the first target encoding feature (i.e., an encoding feature under one piece of modal information) of the target video clip pair. At the same time, the computer device may also perform second feature extraction on each video clip in the target video clip pair to obtain the second target encoding feature (i.e., an encoding feature under another piece of modal information) of the target video clip pair.

It is to be understood that the process of performing, by the computer device, loop recognition on the to-be-recognized video through the target network model may include a video preparation process (i.e., segmentation processing and feature extraction processing). Since a length of a video clip obtained after the segmentation processing on the to-be-recognized video is correlated with input features subsequently inputted to the target network model, the computer device needs to reasonably select, according to an actual application situation and comprehensive consideration of a model processing rate of the target network model, a cutting interval for segmenting the to-be-recognized video. It may be understood that the computer device, when segmenting the acquired to-be-recognized video, may first determine a video duration of the to-be-recognized video, and then segment the acquired to-be-recognized video based on the determined video duration to obtain the N video clips.

The computer device may acquire a cutting duration selection range corresponding to the video duration, and then may select a value (stime) from the cutting duration selection range as the cutting interval and segment the to-be-recognized video according to the cutting interval, so as to obtain the N video clips. For example, if the video duration of the to-be-recognized video (e.g., a video 1) acquired by the computer device is 20 s, the computer device may acquire a cutting duration selection range (e.g., [4, 10]) corresponding to the video duration, may select a value (e.g., 5 s) from the cutting duration selection range as the cutting interval, and then may segment the video 1 according to the cutting interval. In other words, the computer device may slice the video every 5 s, so as to obtain 4 video clips with a video duration of 5 s.

In some examples, the computer device may also first evenly segment the to-be-recognized video according to the video duration of the to-be-recognized video to divide the to-be-recognized video into two parts, so as to obtain two video clips with a same duration (e.g., initial video clips), and then may evenly segment each initial video clip until a video duration of a segmented initial video clip reaches a duration threshold (e.g., 10 s), and the segmentation of the to-be-recognized video is ended. For example, if the video duration of the to-be-recognized video (e.g., a video 2) acquired by the computer device is 40 s, the computer device may first segment the video 2 to obtain two initial video clips with a video duration of 20 s (e.g., an initial video clip a and an initial video clip b), then segment the initial video clip a to obtain two video clips with a video duration of 10 s (e.g., a video clip $P_1$ and a video clip $P_2$), and segment the initial video clip b to obtain two video clips with a video duration of 10 s (e.g., a video clip $P_3$ and a video clip $P_4$). The video clips obtained by segmenting the video 2 by the computer device may be 4 video clips with a video duration of 10 s.

Further, the computer device may acquire a video clip $P_i$ and a video clip $P_j$ from the N video clips, and take the video clip $P_i$ and the video clip $P_j$ as the target video clip pair of the to-be-recognized video. It is to be understood that, in order to make full use of the multi-modal information of the target video clip pair, the computer device not only can perform first feature extraction on each video clip in the target video clip pair to obtain the first target encoding feature of the target video clip pair, but also can perform second feature extraction on each video clip in the target video clip pair to obtain the second target encoding feature of the target video clip pair.

It may be understood that, when the first modal information is video modal information, the computer device may take a video frame corresponding to each video clip in the target video clip pair as a to-be-processed video frame, and determine a frame extraction parameter based on a frame rate of the to-be-processed video frame. Further, the computer device may perform frame extraction processing on the to-be-processed video frame based on the frame extraction parameter to obtain a to-be-encoded video frame correlated with the to-be-processed video frame. For example, when the to-be-processed video frame has a video duration of 6 s and the to-be-processed video frame is at a frame rate of 25 fps, it means that the to-be-processed video frame may transmit 25 video frames per second. In this case, the computer device may perform frame extraction processing on the to-be-processed video frame according to the determined frame extraction parameter (e.g., evenly extract 3 video frames per second) to obtain 18 video frames, and then may take the 18 video frames as to-be-encoded video frames correlated with the to-be-processed video frame.

Further, the computer device may acquire a video encoding model correlated with the video modal information. Herein, the video encoding model may be trained based on a sample image database. The sample image database may be a large visual database for studying visual object recognition software. In some examples, the video encoding model may also be an open-source model. For example, the video encoding model may be an Imagenet pre-trained model. The Imagenet pre-trained model is a deep learning network model trained based on a large general object recognition open-source data set (e.g., an Imagenet data set). It may be understood that the computer device may use a pooling result in a residual network in the open-source Imagenet pre-trained model (e.g., ResNet-101) as a video encoding feature.

Further, referring to Table 1, Table 1 is a schematic structure table of a residual network according to an embodiment of this disclosure. The schematic structure table of the residual network is a network structure of ResNet-101. Table 1 may include convolutional layers (Layer name), output image sizes (Output size), and convolution information in each convolutional layer. As shown in Table 1, the schematic structure table of the residual network may include 7 convolutional network layers, which may specifically include a convolutional network layer 1 (e.g., Conv1), a convolutional network layer 2 (e.g., Conv2_x), a convolutional network layer 3 (e.g., Conv3_x), a convolutional network layer 4 (e.g., Conv4_x), a convolutional network layer 5 (e.g., Conv5_x), a convolutional network layer 6 (e.g., Max pool, i.e., a pooling layer), and a convolutional network layer 7 (e.g., full connection, i.e., a fully connected layer). 101 layers in the residual network refer to quantities of the convolutional network layer and the fully connected layer, without calculating any activation layer or pooling layer.

As shown in Table 1, the convolutional network layer 1 has 64 7×7 convolutions and a stride of 2. The convolutional network layer 2, the convolutional network layer 3, the convolutional network layer 4, and the convolutional network layer 5 are residual blocks. For example, the convolutional network layer 2 includes a maximum pooling layer (a 3×3 pooling layer with a stride of 2) and 3 residual blocks, and each residual block includes 3 layers, which may specifically include 64 1×1 convolutions, 64 3×3 convolutions, and 256 1×1 convolutions. N in the fully connected layer may be a quantity of learned categories. Refer to Table 1 below for details:

TABLE 1

| Layer name | Output size | ResNet-101 | |
|---|---|---|---|
| Conv1 | 300 × 500 | 7 × 7, 64, stride 2 | |
| Conv2_x | 150 × 250 | 3 × 3 max pool, stride 2 | |
| | | 1 × 1, 64 | ×3 blocks |
| | | 3 × 3, 64 | |
| | | 1 × 1, 256 | |
| Conv3_x | 76 × 126 | 1 × 1, 128 | ×4 blocks |
| | | 3 × 3, 128 | |
| | | 1 × 1, 512 | |
| Conv4_x | 8 × 63 | 1 × 1, 256 | ×3 blocks |
| | | 3 × 3, 256 | |
| | | 1 × 1, 1024 | |
| Conv5_x | 19 × 32 | 1 × 1, 512 | ×3 blocks |
| | | 3 × 3, 512 | |
| | | 1 × 1, 2048 | |
| Max pool | | 1 × 2048 | |
| full connection | | 1 × N | |

Figure 4:
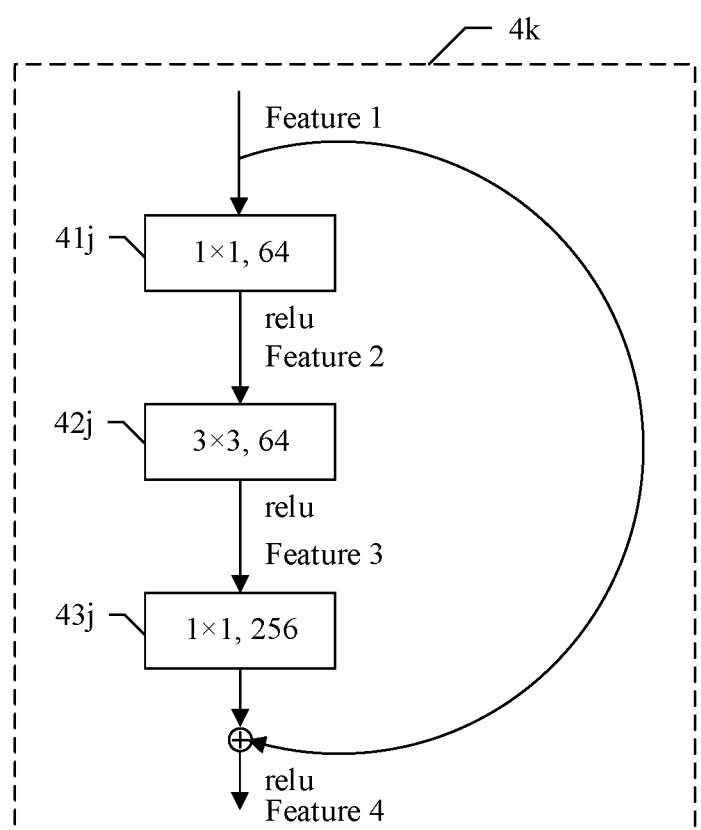
FIG. 4 is a schematic structural diagram of a residual block according to an embodiment of this disclosure.

For ease of understanding, further, referring to FIG. 4, FIG. 4 is a schematic structural diagram of a residual block according to an embodiment of this disclosure. As shown in FIG. 4, a residual block 4k may be a residual block in the convolutional network layer 2 in Table 1 above. The residual block 4k may include 3 convolutional layers, which may specifically include a convolutional layer 41j (e.g., 64 1×1 convolutions), a convolutional layer 42j (e.g., 64 3×3 convolutions), and a convolutional layer 43j (e.g., 256 1×1 convolutions).

The computer device maintains accuracy and reduces a calculation amount during the convolution on the input features through the residual block 4k shown in FIG. 4. As shown in FIG. 4, the computer device, when inputting a feature 1 (e.g., an input feature with 256 dimensions) to the convolutional layer 41j in the residual block 4k, may use 64 1×1 convolutions to reduce the dimensions of the feature 1 to obtain a feature 2 (e.g., a dimension reduction feature with 64 dimensions) to reduce the calculation amount. Then, the computer device may input the feature 2 to the convolutional layer 42j, and then use 64 3×3 convolutions to convolve the feature 2 to obtain a feature 3 (e.g., a convolution feature with 64 dimensions) shown in FIG. 4. Finally, the computer device may input the feature 3 to the convolutional layer 43j to perform feature reduction through 256 1×1 convolutions, so as to obtain a feature 4 (e.g., a reduction feature with 256 dimensions) shown in FIG. 4. The feature 4 may be jointly determined through an output feature of the convolutional layer 43j and a residual of the feature 1. A rectified linear unit (relu) in FIG. 4 is a common activation function in an artificial neural network.

It is to be understood that the computer device in an embodiment of this disclosure may input the to-be-encoded video frame to the above video encoding model, and then may encode the to-be-encoded video frame through the video encoding model to obtain the video encoding feature corresponding to the to-be-encoded video frame. Further, the computer device may obtain the first target encoding feature of the target video clip pair based on the video encoding feature corresponding to the to-be-encoded video frame. The first target encoding feature includes a video encoding feature $S_i$ corresponding to the video clip $P_i$ and a video encoding feature $S_j$ corresponding to the video clip $P_j$.

For example, the computer device may input the to-be-encoded video frame corresponding to the video clip $P_i$ in the target video clip pair to the video encoding model, and the video encoding model outputs the video encoding feature $S_i$ corresponding to the video clip $P_i$. In another example, the computer device may input the to-be-encoded video frame corresponding to the video clip $P_j$ in the target video clip pair to the video encoding model, and the video encoding model outputs the video encoding feature $S_j$ corresponding to the video clip $P_j$. In this case, the computer device may take the video encoding feature $S_i$ and the video encoding feature $S_j$ as the first target encoding feature of the target video clip pair.

As can be seen, when the first modal information is the video modal information, the frame extraction parameter may be determined based on the frame rate of the to-be-processed video frame, so as to accurately extract, from the to-be-processed video frame, a to-be-encoded video frame that can represent a target video clip, thereby obtaining an accurate first target encoding feature.

It may be understood that, when the second modal information is the audio modal information, the computer device may take an audio frame corresponding to each video clip in the target video clip pair as a to-be-processed audio frame, and perform audio preparation processing on the to-be-processed audio frame to obtain a to-be-encoded audio frame correlated with the to-be-processed audio frame. During the audio preparation processing on the to-be-processed audio frame, the computer device may resample the to-be-processed audio frame, and then perform short-time Fourier transform on a resampled to-be-processed audio frame to obtain a spectrum map corresponding to the to-be-processed audio frame. Further, the computer device may map the spectrum map to a filter bank to obtain an initial sound spectrum corresponding to the to-be-processed audio frame. The computer device may determine a stable sound spectrum corresponding to the initial sound spectrum through the following formula (1), and frame the stable sound spectrum according to a framing duration (e.g., 0.96 s) to obtain the to-be-encoded video frame.

Specifically, a calculation formula for the computer device to determine the stable sound spectrum may be shown by the following formula (1):

$$S=\log(\text{mel-spectrum}+0.01) \quad (1)$$

where mel-spectrum denotes the initial sound spectrum, and 0.01 denotes a bias parameter to prevent a need to take the logarithm when the initial sound spectrum is 0.

For example, the computer device may resample the to-be-processed audio frame to obtain a mono audio of 16 kHZ, and then may perform short-time Fourier transform on a resampled to-be-processed audio frame by using a Hann time window of 25 ms with a frame shift of 10 ms, to obtain a corresponding spectrum map. Further, the computer device may map the spectrum map to mel-scale filter banks to obtain an initial sound spectrum (e.g., a mel sound spectrum) corresponding to the to-be-processed audio frame. Further, the computer device may determine a stable mel sound spectrum (e.g., a stable sound spectrum) corresponding to the mel sound spectrum through the above formula (1). The computer device, after obtaining the stable sound spectrum, may frame the stable sound spectrum according to a framing duration of 0.96 s, and no frame overlaps during the framing. Each frame includes 64 mel frequency bands and has a duration of 10 ms (i.e., 96 frames in total).

Further, the computer device may acquire an audio encoding model correlated with the audio modal information. Herein, the audio encoding model may be trained based on a sample audio data set. The sample audio data set may be a data set formed by video tracks carrying audio tags (e.g., an audio with a duration of 10 s). In some examples, the audio encoding model may also be an open-source model. For example, the audio encoding model may also be a Vggish model. The Vggish model is designed to extract common large-scale evaluation tasks for audio event detection, and may extract one 128-dimensional encoding feature per second. An audio encoding feature outputted by the Vggish model may be in a data format of [nums_frames, 128], where nums_frames may denote a frame length of the to-be-encoded audio frame, and nums_frames=an audio duration of the to-be-processed audio frame/0.96.

It is to be understood that the computer device in an embodiment of this disclosure may input the to-be-encoded audio frame to the above audio encoding model, and then may encode the to-be-encoded audio frame through the audio encoding model to obtain the audio encoding feature corresponding to the to-be-encoded audio frame. Further, the computer device may obtain the second target encoding feature of the target video clip pair based on the audio encoding feature corresponding to the to-be-encoded audio frame. The second target encoding feature includes an audio encoding feature $Y_i$ corresponding to the video clip $P_i$ and an audio encoding feature $Y_j$ corresponding to the video clip $P_j$.

For example, the computer device may input the to-be-encoded audio frame corresponding to the video clip $P_i$ in the target video clip pair to the audio encoding model, and the audio encoding model outputs the audio encoding feature $Y_i$ corresponding to the video clip $P_i$. In another example, the computer device may input the to-be-encoded audio frame corresponding to the video clip $P_j$ in the target video clip pair to the audio encoding model, and the audio encoding model outputs the audio encoding feature $Y_j$ corresponding to the video clip $P_j$. In this case, the computer device may take the audio encoding feature $Y_i$ and the audio encoding feature $Y_j$ as the second target encoding feature of the target video clip pair.

As can be seen, when the first modal information is the audio modal information, audio preparation processing may be performed based on the to-be-processed audio frame, so as to accurately determine a to-be-encoded audio frame that can represent a target video clip, thereby obtaining an accurate second target encoding feature.

The video encoding model and the audio encoding model in an embodiment of this disclosure may be independent of the target network model in an embodiment of this disclosure or two sub-models in the target network model, which is not limited herein.

In step S102, a target network model for performing loop recognition on the to-be-recognized video is acquired.

Specifically, the computer device may further acquire a target network model (e.g., a target network model 2000M shown in FIG. 2) for performing loop recognition on the to-be-recognized video. The target network model may include a first target sequence model (e.g., the target sequence model 210M shown in FIG. 2) correlated with the first modal information and a second target sequence model (e.g., the target sequence model 220M shown in FIG. 2) correlated with the second modal information.

In a possible implementation, the first target sequence model may include a first sequence representation learning layer and a first similarity measurement layer, and the second target sequence model includes a second sequence representation learning layer and a second similarity measurement layer.

For example, the first target sequence model may be a sequence similarity learning model correlated with the video modal information, and the first target sequence model may be used for recognizing a target similar result of the target video clip pair under the video modal information. The second target sequence model may be a sequence similarity learning model correlated with the audio modal information, and the second target sequence model may be used for recognizing a target similar result of the target video clip pair under the audio modal information.

In step S103, the first target encoding feature is input into the first target sequence model, and a first target similar result of the target video clip pair is output from the first target sequence model.

The first target similar result may reflect a degree of similarity between two video clips in the target video clip pair based on the first modal information.

In a possible implementation, S103 includes: inputting the first target encoding feature to the first target sequence model, performing sequence feature learning on the first target encoding feature through the first sequence representation learning layer, inputting a first target learning feature obtained after sequence feature learning to the first similarity measurement layer, and outputting, by the first similarity measurement layer, the first target similar result of the target video clip pair.

The target video clip pair may include a video clip $P_i$ and a video clip $P_j$. i and j are positive integers less than or equal to N, and i is not equal to j. Herein, N may denote a total quantity of video clips in the to-be-recognized video. The first sequence representation learning layer in the first target sequence model in an embodiment of this disclosure may include a first network layer correlated with the video clip $P_i$ and a second network layer correlated with the video clip $P_j$, and the first network layer and the second network layer have a same network structure. Specifically, the computer device may input the first target encoding feature to the first target sequence model. Herein, the first target encoding feature may include a video encoding feature $S_i$ and a video encoding feature $S_j$. The video encoding feature $S_i$ may be an encoding feature of the video clip $P_i$ under the first modal information. The video encoding feature $S_j$ may be an encoding feature of the video clip $P_j$ under the first modal information. Further, the computer device may perform sequence feature learning on the video encoding feature $S_i$ through the first network layer in the first sequence representation learning layer to obtain a learning feature $X_i$ corresponding to the video encoding feature $S_i$. Similarly, the computer device may perform sequence feature learning on the video encoding feature $S_j$ through the second network layer in the first sequence representation learning layer to obtain a learning feature $X_j$ corresponding to the video encoding feature $S_j$. Further, the computer device may take the learning feature $X_i$ and the learning feature $X_j$ as first target learning features, and input the first target learning features to the first similarity measurement layer, and the first similarity measurement layer outputs a similarity between the first target learning features. In this case, the computer device may determine the first target similar result of the target video clip pair based on the similarity between the first target learning features.

It may be understood that the similarity measurement layers (i.e., similarity layers) in an embodiment of this disclosure may adopt a cosine-similarity calculation method to calculate a similarity between two features inputted to the similarity measurement layer. A specific calculation formula may be obtained with reference to the following formula (2):

$$L(x,y)=x^T y \tag{2}$$

Herein, x may denote one input feature inputted to the similarity measurement layer, and y may denote the other input feature inputted to the similarity measurement layer.

For example, if the similarity measurement layer is the first similarity measurement layer in the first target sequence model, x herein may denote the learning feature $X_i$ outputted by the first network layer in the first target sequence model, and y herein may denote the learning feature $X_j$ outputted by the second network layer in the first target sequence model.

Figure 5:
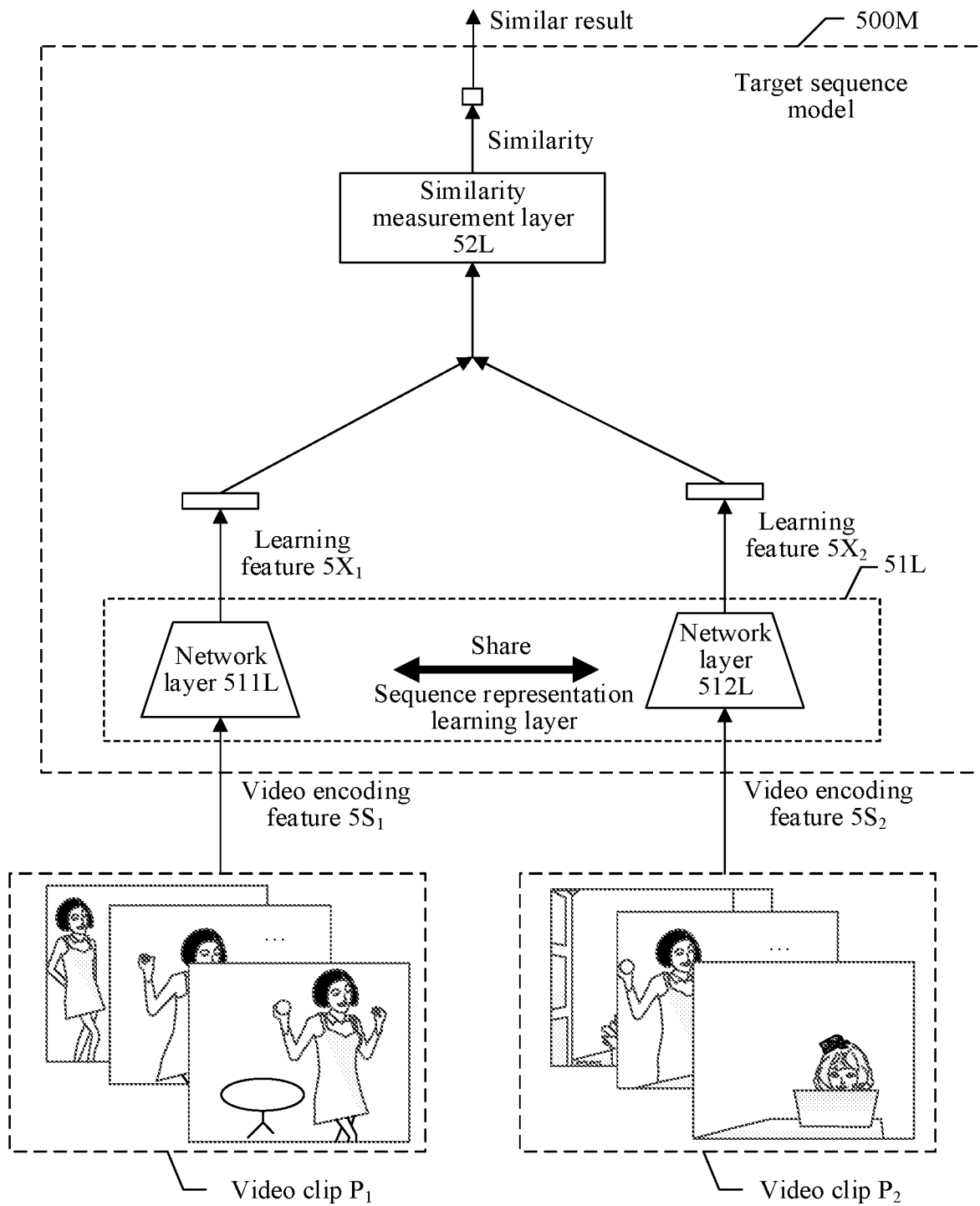
FIG. 5 is a schematic structural diagram of a target sequence model according to an embodiment of this disclosure.

For ease of understanding, further, referring to FIG. 5, FIG. 5 is a schematic structural diagram of a target sequence model according to an embodiment of this disclosure. As shown in FIG. 5, a target sequence model 500M in an embodiment of this disclosure may be a target sequence model correlated with one piece of modal information. For example, the target sequence model 500M may be the target sequence model 210M in the target network model 2000M shown in FIG. 2, that is, the target sequence model correlated with the first modal information (e.g., the video modal information).

The target video clip pair of the to-be-recognized video in an embodiment of this disclosure may include a video clip $P_1$ and a video clip $P_2$. A video encoding feature of the video clip $P_1$ under the video modal information may be a video encoding feature $5S_1$ shown in FIG. 5, and a video encoding feature of the video clip $P_2$ under the video modal information may be a video encoding feature $5S_2$ shown in FIG. 5.

As shown in FIG. 5, the target sequence model 500M may include a sequence representation learning layer 51L (i.e., a first sequence representation learning layer) shown in FIG. 5 and a similarity measurement layer 52L (e.g., a first similarity measurement layer), and the sequence representation learning layer 51L includes a network layer 511L and a network layer 512L. The network layer 511L may be a first network layer correlated with the video clip $P_1$, the network layer 512L may be a second network layer correlated with the video clip $P_2$, and the network layer 511L and the network layer 512L may have a same network structure.

It may be understood that, in an embodiment of this disclosure, the computer device may input the video encoding feature $5S_1$ and the video encoding feature $5S_2$ together to the sequence representation learning layer 51L shown in FIG. 5 to obtain the first target learning feature of the target video clip pair. In other words, the computer device may input the video encoding feature $5S_1$ to the network layer 511L in the sequence representation learning layer 51L, and perform sequence feature learning on the video encoding feature $5S_1$ through the network layer 511L to obtain a learning feature $5X_1$ corresponding to the video encoding feature $5S_1$. At the same time, the computer device may further input the video encoding feature $5S_2$ to the network layer 512L in the sequence representation learning layer 51L, and perform sequence feature learning on the video encoding feature $5S_2$ through the network layer 512L to obtain a learning feature $5X_2$ corresponding to the video encoding feature $5S_2$.

For ease of understanding, further, referring to Table 2, Table 2 is a schematic table of a network structure of a DNN according to an embodiment of this disclosure. The DNN shown in Table 2 may be configured to perform sequence feature learning on a modal encoding feature corresponding to a video clip. For example, the schematic table of the network structure shown in Table 2 may be a schematic table of a network structure corresponding to the network layer 511L or the network layer 512L shown in FIG. 5.

Table 2 may include a sub-network layer, each convolutional layer (Layer name) in the sub-network layer, an input/output feature size (Input/Output size) of each convolutional layer, and a convolution kernel (Kernel) in each convolutional layer. As shown in Table 2, the first network layer in the first sequence representation learning layer in an embodiment of this disclosure may include a first sub-network layer (e.g., a sub-network layer $L_1$), a second sub-network layer (e.g., a sub-network layer $L_2$), a third sub-network layer (e.g., a sub-network layer $L_3$), and a fourth sub-network layer (e.g., a sub-network layer $L_4$). A stride and a dilated convolution parameter (dilate) in each convolutional layer shown in Table 2 may be dynamically adjusted according to an actual situation. Refer to Table 2 below for details:

TABLE 2

| Sub-network layer | Layer name | Input/Output size | Kernel | |
|---|---|---|---|---|
| Sub-network layer $L_1$ | Conv1 | 18 × 2048, 18 × 1024 | 7 × 7, 1024, stride2, dilate1 | |
| | Conv2 | 18 × 1024, 18 × 1024 | 7 × 7, 1024, stride2, dilate1 | |
| | Conv3 | 18 × 2048, 9 × 1024 | 7 × 7, 1024, stride2, dilate2 | |
| | Concate | (18 × 2048, 9 × 1024), 27 × 1024 | — | |
| Sub-network layer $L_2$ | Conv4_x | 27 × 1024, 14 × 1024 | 1 × 1, 1024, dilate2<br>3 × 3, 1024<br>1 × 1, 1024 | ×1 blocks |
| Sub-network layer $L_3$ | Conv5_x | 14 × 1024, 7 × 512 | 1 × 1, 512, dilate2<br>3 × 3, 512<br>1 × 1, 512 | ×1 blocks |
| Sub-network layer $L_4$ | Conv6_x | 7 × 512, 1 × 512 | 1 × 7, 512 | blocks |

In a specific implementation of performing sequence feature learning on the video encoding feature $S_i$ through the first network layer in the first sequence representation learning layer, the computer device may perform feature conversion on the video encoding feature $S_i$ through the first sub-network layer in the first network layer, so as to obtain a first conversion feature corresponding to the video encoding feature $S_i$. The first sub-network layer in the first network layer may include a first convolutional layer (e.g., a convolutional layer Conv1 shown in Table 2), a second convolutional layer convolutional layer (e.g., a convolutional layer Conv2 shown in Table 2), and a dilated convolution layer (e.g., a convolutional layer Conv3 shown in Table 2). For example, both the stride and the dilated convolution parameter in the dilated convolution layer Conv3 may be 2. A feature concatenation layer (e.g., a concatenation layer Concate shown in Table 2) is configured to concatenate an output feature in the convolutional layer Conv1 and an output feature in the convolutional layer Conv2 to obtain an input feature inputted to the second sub-network layer.

It may be understood that, when the computer device inputs the video encoding feature $S_i$ to the first sub-network layer (e.g., the sub-network layer L1 shown in Table 2) in the first network layer, the computer device may convolve the video encoding feature $S_i$ through the dilated convolution layer to obtain a first convolution feature corresponding to the video encoding feature $S_i$. At the same time, the computer device may further convolve the video encoding feature $S_i$ through the first convolutional layer to obtain a second convolution feature corresponding to the video encoding feature $S_i$, input the second convolution feature to the second convolutional layer, and convolve the second convolution feature through the second convolutional layer to obtain a third convolution feature. In this case, the computer device may concatenate the first convolution feature and the second convolution feature to obtain the first conversion feature corresponding to the video encoding feature $S_i$.

Further, the computer device may first input the first conversion feature to the second sub-network layer (e.g., the sub-network layer L2 shown in Table 2), and perform feature conversion on the first conversion feature through the second sub-network layer to obtain a second conversion feature corresponding to the first conversion feature. Then, the computer device may input the second conversion feature to the third sub-network layer, and perform feature conversion on the second conversion feature through the third sub-network layer to obtain a third conversion feature corresponding to the second conversion feature. Finally, the computer device may input the third conversion feature to the fourth sub-network layer, and maximally pool the third conversion feature through a maximum pooling layer in the fourth sub-network layer to obtain the learning feature $X_i$ corresponding to the video encoding feature $S_i$.

The plurality of sub-network layers included in the first network layer sequentially perform feature conversion on the video encoding feature, which can improve accuracy of extraction of effective data of the video encoding feature and obtain a more accurate learning feature.

Figure 6:
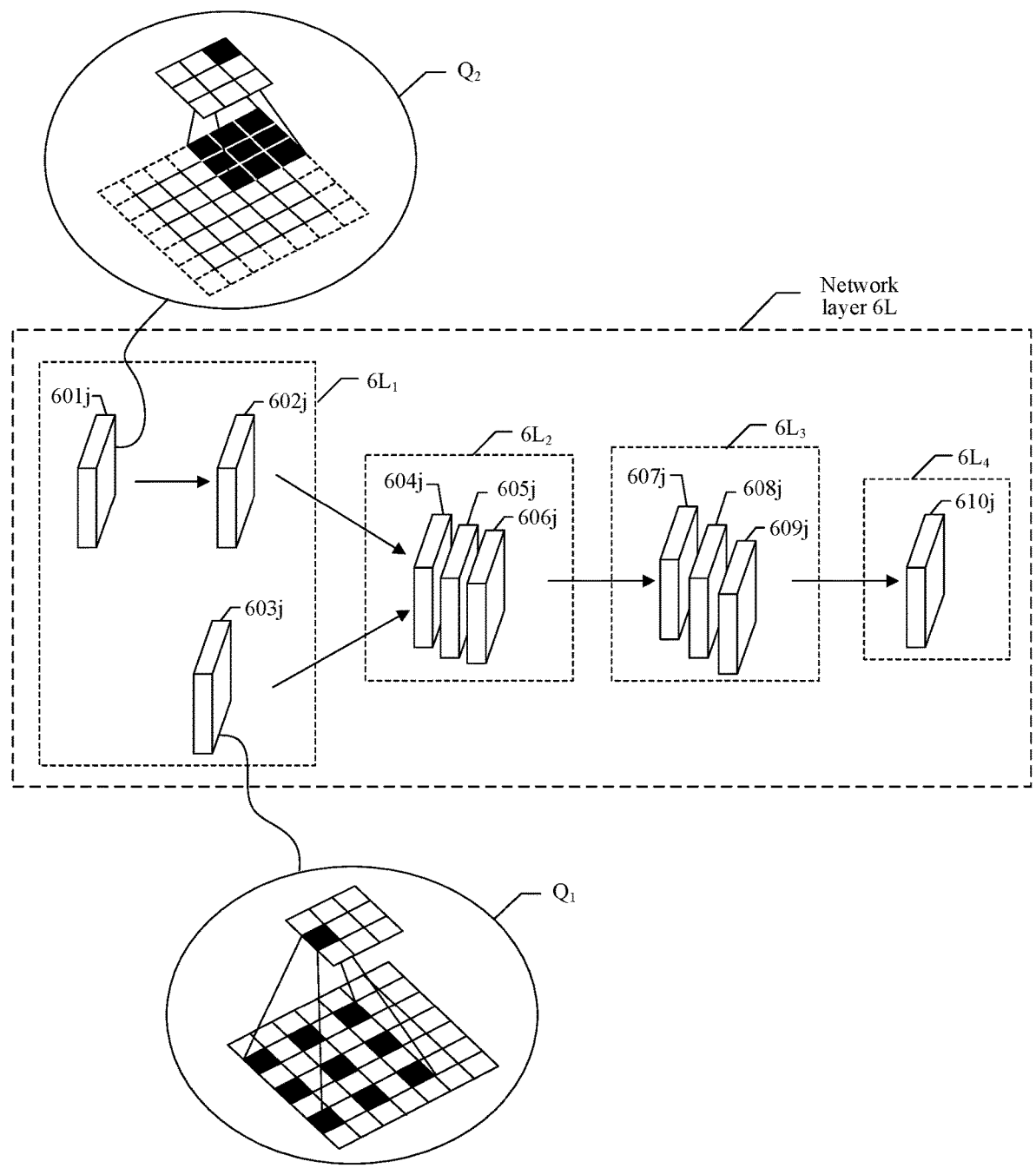
FIG. 6 is a schematic network diagram of a deep neural network (DNN) according to an embodiment of this disclosure.

For ease of understanding, further, referring to FIG. 6, FIG. 6 is a schematic network diagram of a DNN according to an embodiment of this disclosure. The DNN (e.g., a network layer 6L shown in FIG. 6) may be configured to perform sequence feature learning on an encoding feature corresponding to one video clip in the target video clip pair. The network layer 6L may be the network layer 511L shown in FIG. 5 or the network layer 512L shown in FIG. 5.

The network layer 6L may include a sub-network layer $6L_1$ (i.e., a first sub-network layer), a sub-network layer $6L_2$ (i.e., a second sub-network layer), a sub-network layer $6L_3$ (i.e., a third sub-network layer), and a sub-network layer $6L_4$ (i.e., a fourth sub-network layer). As shown in FIG. 6, the sub-network layer $6L_1$ may include a first convolutional layer (e.g., a convolutional layer 601j), a second convolutional layer (e.g., a convolutional layer 602j), and a dilated convolution layer (e.g., a convolutional layer 603j). It may be understood that the dilated convolution layer may include the following functions: (1) Enlarge a receptive field: In order to increase the receptive field and reduce a calculation amount in the DNN, downsampling is generally needed to increase the receptive field, but this may lead to reduction of spatial resolution. In order not to lose the resolution and still enlarge the receptive field, dilated convolution may be used in an embodiment of this disclosure. (2) Capture multi-scale context information: A dilated convolution parameter (dilation rate) in the dilated convolution layer may be set according to an actual situation, which specifically means that the convolution kernel is filled with (dilation rate-1) 0. Therefore, when different dilation rates are set, the receptive field may vary, that is, multi-scale information is acquired.

The convolutional layer 603j shown in FIG. 6 may be a convolutional layer with a dilated convolution parameter of 2, i.e., a dilated convolution layer, which means that the computer device may fill the convolution kernel with one 0. As shown by a region Q1 in FIG. 6, the computer device may find a 5×5 region in an image according to a 3×3 convolution kernel in the convolution layer 603j, and select a corresponding position according to a value of the dilated convolution parameter for multiplication operation. The convolutional layer 601j and the convolutional layer 602j shown in FIG. 6 may be convolutional layers with a dilated convolution parameter of 1, i.e., conventional convolutional layers. It may be understood that, when the dilated convolution parameter is 1, which means that the computer device cannot fill the convolution kernel with 0, as shown in a region Q2 in FIG. 6, the computer device may find a 3×3 region in the image according to a 3×3 convolution kernel in the convolutional layer 601.

As shown in Table 2 above, in a specific implementation of performing sequence feature learning on a feature 1 (e.g., a video encoding feature $S_i$ with 18×2048 dimensions), the computer device may take the feature 1 as an input feature of the sub-network layer 6L1. In this case, the computer device may convolve the feature 1 through 1024 7×7 convolution kernels in the convolutional layer 603j in the sub-network layer 6L1 to obtain a first convolution feature (e.g., a feature 2 with 9×1024 dimensions). At the same time, the computer device may further convolve the feature 1 through 1024 7×7 convolution kernels in the convolutional layer 601j in the sub-network layer 6L1 to obtain a second convolution feature (e.g., a feature 3 with 18×1024 dimensions). Further, the computer device may take the feature 3 as an input feature of the convolutional layer 602j, and convolve the feature 3 through 1024 7×7 convolution kernels in the convolutional layer 602j to obtain a second convolution feature (e.g., a feature 4 with 18×1024 dimensions). Further, the computer device may concatenate the feature 2 and the feature 4 to obtain an output feature (i.e., a first conversion feature with 27×1024 dimensions) of the sub-network layer 6L1.

Then, the computer device may input the first conversion feature with 27×1024 dimensions to the sub-network layer 6L2 to obtain a second conversion feature with 14×1024 dimensions through 1024 1×1 convolution kernels in a convolutional layer 604j, 1024 3×3 convolution kernels in a convolutional layer 605j, and 1024 1×1 convolution kernels in a convolutional layer 606j in the sub-network layer 6L2.

Further, the computer device may input the second conversion feature with 14×1024 dimensions to the sub-network layer 6L3 shown in FIG. 6 to obtain a third conversion feature with 7×512 dimensions through 512 1×1 convolution kernels in a convolutional layer 607j, 512 3×3 convolution kernels in a convolutional layer 608j, and 512 1×1 convolution kernels in a convolutional layer 609j in the sub-network layer 6L3.

Finally, the computer device may input the third conversion feature with 7×512 dimensions to the sub-network layer 6L4 shown in FIG. 6, and maximally pool the third conversion feature through 512 1×7 convolution kernels in a convolutional layer 610j (i.e., a maximum pooling layer) in the sub-network layer 6L4 to obtain a learning feature $X_i$ with 1×512 dimensions.

Similarly, the computer device may input the video encoding feature $S_j$ to the second network layer having a same network structure as the network layer 6L shown in FIG. 6, to obtain a learning feature $X_j$ corresponding to the video encoding feature $S_j$, and take the learning feature $X_i$ and the learning feature $X_j$ as first target learning features of the target video clip pair.

As shown in FIG. 5, the first target learning features determined by the computer device may be the learning feature $5X_1$ and the learning feature $5X_2$ shown in FIG. 5. In this case, the computer device inputs the learning feature $5X_1$ and the learning feature $5X_2$ together to the similarity measurement layer 52L shown in FIG. 5, output, by the similarity measurement layer 52L, a similarity between the learning feature $5X_1$ and the learning feature $5X_2$, and then determine a first target similar result of the target video clip pair based on the similarity outputted by the similarity measurement layer 52L.

Herein, the similarity outputted by the similarity measurement layer 52L may be mapped between 0 and 1 by using such an activation function as sigmod. As shown in FIG. 5, the computer device may acquire a similar threshold (e.g., 0.5) correlated with the target sequence model 500M. Herein, the similar threshold may be dynamically adjusted according to an actual situation. If the similarity (e.g., 0.4) between the learning feature $5X_1$ and the learning feature $5X_2$ does not reach the similar threshold, the computer device may determine that the first target similar result of the target video clip pair indicates that the video clip $P_1$ and the video clip $P_2$ are not similar under the video modal information. If the similarity (e.g., 0.8) between the learning feature $5X_1$ and the learning feature $5X_2$ reaches the similar threshold, the computer device may determine that the first target similar result of the target video clip pair indicates that the video clip $P_1$ and the video clip $P_2$ are similar under the video modal information.

Therefore, sequence feature learning may be performed on the two video clips in the target video clip pair respectively through the first network layer and the second network layer included in the first target sequence model, so as to more accurately recognize a feature similarity between the two video clips and improve accuracy of the first target similar result.

In step S104, the second target encoding feature is input into the second target sequence model, and a second target similar result of the target video clip pair is output from the second target sequence model.

The second target similar result may reflect a degree of similarity between the two video clips in the target video clip pair based on the second modal information.

In a possible implementation, S104 includes: inputting the second target encoding feature to the second target sequence model, performing sequence feature learning on the second target encoding feature through the second sequence representation learning layer, inputting a second target learning feature obtained after sequence feature learning to the second similarity measurement layer, and outputting, by the second similarity measurement layer, the second target similar result of the target video clip pair.

Specifically, the computer device may input the second target encoding feature to the second target sequence model correlated with the second modal information. Herein, the second target encoding feature may include an audio encoding feature $Y_i$ and an audio encoding feature $Y_j$. The audio encoding feature $Y_i$ may be an encoding feature of the video clip $P_i$ under the second modal information. The audio encoding feature $Y_j$ may be an encoding feature of the video clip $P_j$ under the second modal information. Further, the computer device may perform sequence feature learning on the audio encoding feature $Y_i$ through a network layer (i.e., a third network layer) correlated with the audio encoding feature $Y_i$ in the second sequence representation learning layer to obtain a learning feature $Z_i$ corresponding to the audio encoding feature $Y_i$. Similarly, the computer device may perform sequence feature learning on the audio encoding feature $Y_j$ through a network layer (i.e., a fourth network layer) correlated with the audio encoding feature $Y_j$ in the second sequence representation learning layer to obtain a learning feature $Z_j$ corresponding to the audio encoding feature $Y_j$. Further, the computer device may take the learning feature $Z_i$ and the learning feature $Z_j$ as second target learning features, and input the second target learning features to the second similarity measurement layer, and the second similarity measurement layer outputs a similarity between the second target learning features. In this case, the computer device may determine the second target similar result of the target video clip pair based on the similarity between the second target learning features.

A specific implementation in which the computer device determines the second target similar result of the target video clip pair may be obtained with reference to the above specific implementation of determining the first target similar result of the target video clip pair in S103. Details are not described herein again.

In step S105, the first target similar result is compared with the second target similar result to obtain a loop comparison result of the target video clip pair.

Specifically, the computer device may compare the first target similar result with the second target similar result. The computer device may obtain a loop video result of the target video clip pair in a case that the first target similar result indicates that the target video clip pair is similar under the first modal information and the second target similar result indicates that the target video clip pair is similar under the second modal information. In some examples, the computer device may obtain a non-loop video result of the target video clip pair in a case that the first target similar result indicates that the target video clip pair is not similar under the first modal information or the second target similar result indicates that the target video clip pair is not similar under the second modal information. In this case, the computer device may take the loop video result or the non-loop video result as the loop comparison result of the target video clip pair. The loop comparison result of the target video clip pair may be used for indicating a video type of the to-be-recognized video.

It may be understood that, if the first target similar result and the second target similar result of the target video clip pair are similar results with the value of "1", the computer device may determine that the loop comparison result of the target video clip pair is a loop video result with the value of "1", which means that pictures and audios in the two video clips in the target video clip pair are duplicated with each other. In some examples, if the first target similar result or the second target similar result of the target video clip pair is a similar result with the value of "0", the computer device may determine that the loop comparison result of the target video clip pair is a non-loop video result with the value of "0", which means that the two video clips in the target video clip pair are not duplicated with each other.

As can be seen, the loop comparison result of the target video clip pair can be more accurately obtained by making full use of information of the target video clip pair under different modes and determining, based on consistency of similarity results between different modes, whether the target video clip pair is a loop video result, thereby improving accuracy of video loop recognition.

In an embodiment of this disclosure, the computer device, when performing loop recognition on a to-be-recognized video, may acquire a target video clip pair of the to-be-recognized video in advance, and determine a first target encoding feature and a second target encoding feature of the target video clip pair. Herein, first modal information (e.g., video modal information) corresponding to the first target encoding feature is different from second modal information (e.g., audio modal information) corresponding to the second target encoding feature. The computer device, when acquiring a target network model for performing loop recognition on the to-be-recognized video, may make full use of video information of the target video clip pair, that is, may determine a first target similar result of the target video clip pair under the first modal information through a first target sequence model in the target network model, and may also determine a second target similar result of the target video clip pair under the second modal information through a second target sequence model in the target network model. Further, the computer device may compare the first target similar result with the second target similar result to more accurately obtain a loop comparison result of the target video clip pair, so as to improve the accuracy of video loop recognition.

Figure 7:
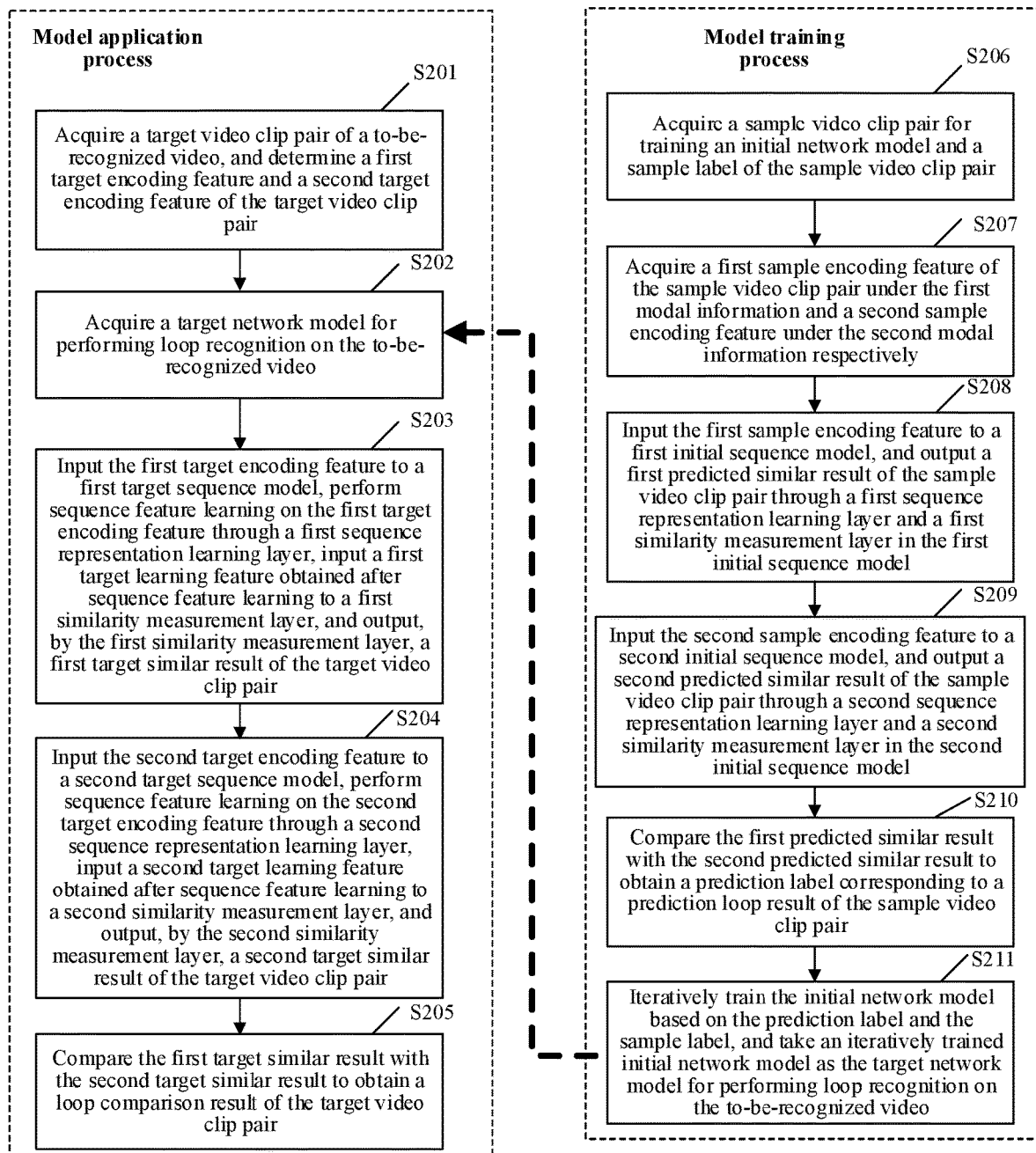
FIG. 7 is a schematic flowchart of a video loop recognition method according to an embodiment of this disclosure.

Further, referring to FIG. 7, FIG. 7 is a schematic flowchart of a video loop recognition method according to an embodiment of this disclosure. The method may be performed by a computer device with a video loop recognition function. The computer device may be a user terminal (e.g., any user terminal in the user terminal cluster shown in FIG. 1, for example, the user terminal 100a), or a server (e.g., the server 10 shown in FIG. 1). The method may also be jointly performed by a user terminal with a model application function and a server with a model training function. No limitation is made herein. The method may include at least the following steps S201 to S211:

In step S201, a target video clip pair of a to-be-recognized video is acquired, and a first target encoding feature and a second target encoding feature of the target video clip pair are determined.

In step S202, a target network model for performing loop recognition on the to-be-recognized video is acquired.

In step S203, the first target encoding feature is input to a first target sequence model, sequence feature learning on the first target encoding feature is performed through a first sequence representation learning layer, a first target learning feature obtained after sequence feature learning is input into a first similarity measurement layer, and the first similarity measurement layer outputs a first target similar result of the target video clip pair.

In step S204, the second target encoding feature is input into a second target sequence model, sequence feature learning on the second target encoding feature is performed through a second sequence representation learning layer, a second target learning feature obtained after sequence feature learning is input into a second similarity measurement layer, and the second similarity measurement layer outputs a second target similar result of the target video clip pair.

In step S205, the first target similar result is compared with the second target similar result to obtain a loop comparison result of the target video clip pair.

The video loop recognition method in an embodiment of this disclosure may include a model training process and a model application process. It may be understood that the model application process has been described in S201 to S205, and a specific implementation of the model application process may be obtained with reference to the above descriptions about S101 to S105 in the embodiment corresponding to FIG. 3. Details are not described herein again.

The computer device may determine the video type of the to-be-recognized video to be a loop video type in a case that the loop comparison result is a loop video result. Further, the computer device may also generate loop prompt information based on the loop video type, and return the loop prompt information to a user terminal. The user terminal may be a transmitter of the to-be-recognized video.

Figure 8:
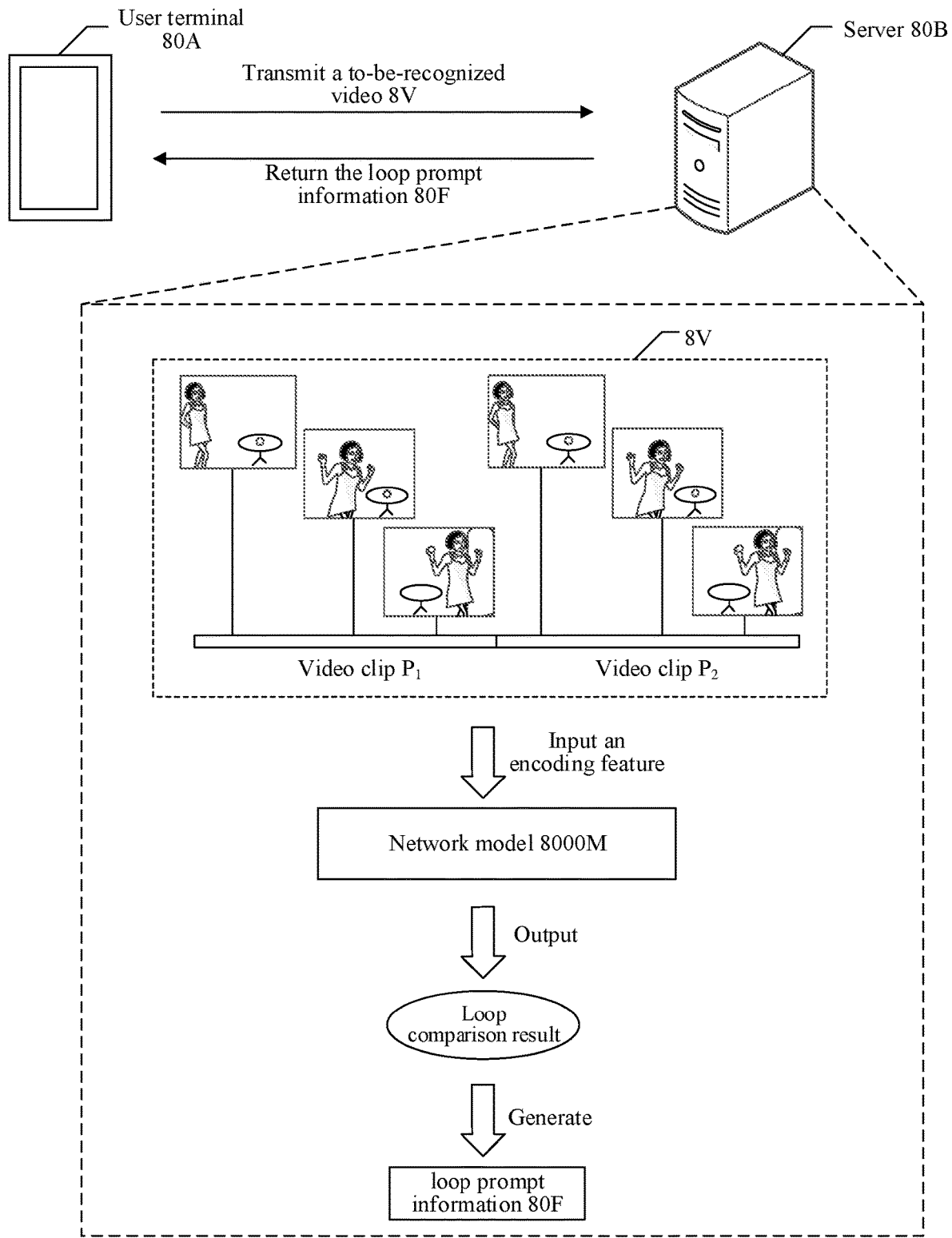
FIG. 8 is a schematic diagram of a scenario of data exchange according to an embodiment of this disclosure.

For ease of understanding, further, referring to FIG. 8, FIG. 8 is a schematic diagram of a scenario of data exchange according to an embodiment of this disclosure. As shown in FIG. 8, a server 80B in an embodiment of this disclosure may be a computer device with a video loop recognition function. The server 80B may be the server 10 shown in FIG. 1. A user terminal 80A in an embodiment of this disclosure may be a user terminal having a network connection relationship with the server 80B. For example, the user terminal may be any user terminal in the user terminal cluster shown in FIG. 1, for example, the user terminal 100*b*.

As shown in FIG. 8, the user terminal 80A may transmit a to-be-recognized video 8V to the server 80B, so that the server 80B can acquire a trained target network model to perform loop recognition on the to-be-recognized video 8V to determine a video type of the to-be-recognized video 8V. As shown in FIG. 8, the server 80B, when receiving the to-be-recognized video 8V, may segment the to-be-recognized video 8V to acquire a target video clip pair of the to-be-recognized video 8V. The target video clip pair of the to-be-recognized video 8V may include a video clip $P_1$ and a video clip $P_2$ shown in FIG. 8.

Further, the server 80B may determine a first target encoding feature and a second target encoding feature of the target video clip pair. When acquiring the target network model (e.g., a network model 8000M shown in FIG. 8), the server 80B may input the first target encoding feature and the second target encoding feature together to the network model 8000M, and the network model 8000M performs loop recognition on the target video clip pair to obtain a loop comparison result of the target video clip pair.

It may be understood that, if the loop comparison result is a loop video result, the server 80B may determine the video type of the to-be-recognized video 8V to be a loop video type. In this case, the server 80B may generate, based on the determined loop video type, loop prompt information (e.g., loop prompt information 80F shown in FIG. 8) for prompting the user terminal 80A. Further, the server 80B may return the loop prompt information 80F to the user terminal 80A.

It is to be understood that the user terminal 80A may determine, according to the loop prompt information 80F, whether the server 80B is required to filter the to-be-recognized video 8V. When a user corresponding to the user terminal 80A determines that a duplicate clip in the to-be-recognized video 8V needs to be filtered, the user may perform a trigger operation for instructing the server 80B to filter the to-be-recognized video 8V, so that the user transmits a filter request to the server 80B in response to the trigger operation. The server 80B, when receiving the filter request, may filter the to-be-recognized video 8V, and then may store a filtered to-be-recognized video 8V to a database of the server 80B.

It may be understood that, when the server 80B is connected to a blockchain node in a blockchain network, the server 80B may also package the filtered to-be-recognized video 8V and generate a to-be-verified block including the filtered to-be-recognized video 8V, and then may broadcast the to-be-verified block to a consensus node in the blockchain network, so that the consensus node can perform block consensus. Moreover, when a received block consensus node indicates that the consensus is successful, the server 80B may write the to-be-verified block to a blockchain in the blockchain network, that is, write the filtered to-be-recognized video 8V to the blockchain network. The blockchain is a new application mode of computer technologies such as distributed data storage, point-to-point transmission, a consensus mechanism, and an encryption algorithm. The block chain is essentially a decentralized database and is a string of data blocks generated through association by using a cryptographic method. Each data block comprises information of a batch of network transactions, the information being used for verifying the validity of information of the data block (anti-counterfeiting) and generating a next data block.

The model training process may be specifically obtained with reference to the following descriptions about S206 to S211.

In step S206, a sample video clip pair for training an initial network model and a sample label of the sample video clip pair are acquired.

Specifically, the computer device may randomly acquire a video clip (e.g., a video clip A) from a sample video clip set as an initial sample video clip. Further, the computer device may attack the initial sample video clip as a whole (adding Gaussian noise and changing a video frame rate of the video clip A) to obtain a target sample video clip corresponding to the initial sample video clip. Further, the computer device may annotate a video clip pair formed by the initial sample video clip and the target sample video clip to obtain a video clip pair carrying a first sample label (for example, a positive sample label). In an embodiment of this disclosure, the video clip pair carrying the first sample label may be referred to as a positive sample video clip pair. In addition, the computer device may further select, from the sample video clip set, K video clips not duplicated with the initial sample video clip, and then may annotate each video clip among the selected K video clips and the initial sample video clip to obtain K video clip pairs carrying second sample labels (e.g., negative sample labels). In an embodiment of this disclosure, the video clip pair carrying the second sample label may be referred to as a negative sample video clip pair. Further, the computer device may take the positive sample video clip pair and the negative sample video clip pair as sample video clip pairs for training the initial network model, and both the first sample label and the second sample label may be referred to as sample labels of the corresponding sample video clip pairs.

For example, the computer device, when acquiring the positive sample video clip pair, may perform even frame extraction processing on the video clip A to update the frame rate of the video clip A from original 25 fps to 12 fps, and then take the video clip A at 25 fps and the video clip A at 12 fps as a positive sample video clip pair that needs to be annotated as being duplicated with each other.

In step S207, a first sample encoding feature of the sample video clip pair under the first modal information and a second sample encoding feature under the second modal information are acquired respectively.

Specifically, the computer device may perform first feature extraction on each video clip in the sample video clip pair to obtain the first sample encoding feature (i.e., an encoding feature under the first modal information) of the sample video clip pair. At the same time, the computer device may further perform second feature extraction on each video clip in the sample video clip pair to obtain the second sample encoding feature (i.e., an encoding feature under the second modal information) of the sample video clip pair.

The sample video clip pair may include a first sample video clip (e.g., a video clip A) and a second sample video clip (e.g., a video clip B). The first sample encoding feature of the sample video clip pair may include a video encoding feature of the video clip A under the first modal information (e.g., a video encoding feature $S_A$) and a video encoding feature of the video clip B under the first modal information (e.g., a video encoding feature $S_B$). The second sample encoding feature of the sample video clip pair may include a video encoding feature of the video clip A under the second modal information (e.g., an audio encoding feature $Y_A$) and a video encoding feature of the video clip B under the second modal information (e.g., an audio encoding feature $Y_B$).

In step S208, the first sample encoding feature is input into a first initial sequence model, and a first predicted similar result of the sample video clip pair is output through a first sequence representation learning layer and a first similarity measurement layer in the first initial sequence model.

The first sequence representation learning layer in the first initial sequence model may include a first network layer correlated with the video clip A and a second network layer correlated with the video clip B, and the first network layer and the second network layer have a same network structure. Specifically, the computer device may input the first sample encoding feature to the first initial sequence model. Further, the computer device may perform sequence feature learning on the video encoding feature $S_A$ through the first network layer in the first sequence representation learning layer in the first initial sequence model to obtain a learning feature $X_A$ corresponding to the video encoding feature $S_A$. Similarly, the computer device may perform sequence feature learning on the video encoding feature $S_B$ through the second network layer in the first sequence representation learning layer to obtain a learning feature $X_B$ corresponding to the video encoding feature $S_B$. Further, the computer device may take the learning feature $X_A$ and the learning feature $X_B$ as first sample learning features, and input the first sample learning features to the first similarity measurement layer, and the first similarity measurement layer outputs a similarity between the first sample learning features. In this case, the computer device may determine the first predicted similar result of the sample video clip pair based on the similarity between the first sample learning features.

In step S209, the second sample encoding feature is input into a second initial sequence model, and a second predicted similar result of the sample video clip pair is output through a second sequence representation learning layer and a second similarity measurement layer in the second initial sequence model.

Specifically, the computer device may input the second sample encoding feature to the second initial sequence model correlated with the second modal information. Further, the computer device may perform sequence feature learning on the audio encoding feature $Y_A$ through a network layer (i.e., a third network layer) correlated with the audio encoding feature $Y_A$ in the second sequence representation learning layer to obtain a learning feature $Z_A$ corresponding to the audio encoding feature $Y_A$. Similarly, the computer device may perform sequence feature learning on the audio encoding feature $Y_B$ through a network layer (i.e., a fourth network layer) correlated with the audio encoding feature $Y_B$ in the second sequence representation learning layer to obtain a learning feature $Z_B$ corresponding to the audio encoding feature $Y_B$. Further, the computer device may take the learning feature $Z_A$ and the learning feature $Z_B$ as second sample learning features, input the second sample learning features to the second similarity measurement layer, and output, by the second similarity measurement layer, a similarity between the second sample learning features. In this case, the computer device may determine the second predicted similar result of the sample video clip pair based on the similarity between the second sample learning features.

A specific implementation of S207 to S209 may be obtained with reference to the above descriptions about S102 to S104 in the embodiment corresponding to FIG. 3. Details are not described herein again.

In step S210, the first predicted similar result is compared with the second predicted similar result to obtain a prediction label corresponding to a prediction loop result of the sample video clip pair.

Specifically, the computer device may compare the first predicted similar result with the second predicted similar result. The computer device may obtain a loop video result of the sample video clip pair in a case that the first predicted similar result indicates that the sample video clip pair is similar under the first modal information and the second predicted similar result indicates that the sample video clip pair is similar under the second modal information. In some examples, the computer device may obtain a non-loop video result of the sample video clip pair in a case that the first predicted similar result indicates that the sample video clip pair is not similar under the first modal information or the second predicted similar result indicates that the sample video clip pair is not similar under the second modal information. In this case, the computer device may take the loop video result or the non-loop video result as the prediction loop result of the sample video clip pair, and then may determine the prediction label corresponding to the sample video clip pair based on the prediction loop result.

Herein, the prediction loop result may include a first prediction loop result of the positive sample video clip pair and a second prediction loop result of the negative sample video clip pair. Herein, the prediction label may include a first prediction label corresponding to the first prediction loop result and a second prediction label corresponding to the second prediction loop result.

In step S211, the initial network model is trained iteratively based on the prediction label and the sample label, and an iteratively trained initial network model is taken as the target network model for performing loop recognition on the to-be-recognized video.

Specifically, the computer device may determine, based on a sample proportion between the positive sample video clip pair and the negative sample video clip pair indicated by the sample label, a loss weight parameter correlated with a model loss function of the initial network model. Further, the computer device may obtain a positive sample loss of the positive sample video clip pair based on the first prediction label and the first sample label, and obtain a negative sample loss of the negative sample video clip pair based on the second prediction label and the second sample label. In this case, the computer device may obtain a model loss corresponding to the model loss function based on the positive sample loss, the negative sample loss, and the loss weight parameter, and iteratively train the initial network model based on the model loss to obtain a model training result. Further, the computer device may acquire, based on the model training result, the target network model for performing loop recognition on the to-be-recognized video.

Specifically, the model loss parameter of the initial network model in an embodiment of this disclosure may be obtained with reference to the following formulas (3) to (4):

$$E = \sum_{x,y \in P_{same}} \ln(Pr(x, y)) - K \sum_{x,y \in P_{diff}} \ln(1 - Pr(x, y)) \quad (3)$$

$$Pr(x, y) = \frac{1}{1 + e^{-L(x,y)}} \quad (4)$$

where L(x,y) denotes the predicted similar result outputted by the initial network model (e.g., a predicted similar result with a value of "1" or a value of "0").

$$\sum_{x,y \in P_{same}} \ln(1 - Pr(x, y))$$

may denote the positive sample loss of the positive sample video clip pair obtained by the computer device based on the first prediction label and the first sample label, and $$\sum_{x,y \in P_{diff}} \ln(1 - Pr(x, y))$$

may denote the negative sample loss of the negative sample video clip pair obtained by the computer device based on the second prediction label and the second sample label. Herein, K denotes the loss weight parameter correlated with the model loss parameter of the initial network model. For example, if the sample proportion between the positive sample video clip pair and the negative sample video clip pair indicated by the sample label is 1:10, the loss weight parameter herein may be 0.1. Model training performed using the positive and negative sample video clip pairs can prevent the problem of overfitting during the training, and can help to improve accuracy of the target network model. Moreover, the proportion of the positive and negative sample video clip pairs can be controlled to balance the proportion of the positive and negative sample video clip pairs, so as to further improve the training efficiency and the accuracy of the target network model.

It is to be understood that during the iterative training of the initial network model based on the model loss, the computer equipment can use a stochastic gradient descent (SGD) based gradient descent method to determine a model parameters w and a bias parameters b of the initial network model, and during each iteration, can determine a gradient and update parameters of the initial network model by back-propagating the determined model loss (i.e., a prediction result error) to the initial network model.

Firstly, the computer device may perform parameter initialization on the model parameter of the initial network model, that is, all the convolutional layers may be initialized by Gaussian distribution with a variance of 0.01 and a mean of 0. Secondly, the computer device may set a learning parameter, so that all network parameters need to be learned. The computer device may set a learning rate of the initial network model to 0.005. Further, the computer device can perform multiple iterations when iteratively training the initial network model. That is, the computer device may divide the sample video clip pair into multiple batches and take a quantity of sample video clip pairs captured in each batch as current training samples.

A specific process may be as follows: The computer device may set all the parameters of the initial network model to a learning state. When iteratively training the initial network model, the computer device needs to perform forward calculation on the sample encoding features (e.g., the first sample encoding feature and the second sample encoding feature) of the sample video clip pair captured in a current batch to obtain a prediction loop result, and then may calculate a loss function according to the prediction loop result of the sample video clip pair, and transmit a model loss value back to the initial network model. Then, the computer device may adopt an SGD method for backward calculation and obtain updated values of all model parameters to update the model parameters, so as to achieve a weight optimization.

The computer device may further acquire a model convergence condition correlated with the initial network model. The model convergence condition may be that model training is stopped if the model loss lasts for N rounds (for example, 10 rounds) and does not continue to decline. In some examples, the model convergence condition may also be that model training is stopped if the model loss is less than a loss threshold in the model convergence condition. The model convergence condition is not defined herein.

It may be understood that, in a case that the model training result indicates that the iteratively trained initial network model satisfies the model convergence condition, the initial network model satisfying the model convergence condition is taken as the target network model for performing loop recognition on the to-be-recognized video. In some examples, the computer device may adjust, in a case that the model training result indicates that the iteratively trained initial network model does not satisfy the model convergence condition, a model parameter of the initial network model based on the model loss function not satisfying the model convergence condition. Further, the computer device may take the initial network model after the adjustment of the model parameter as a transition network model, iteratively train the transition network model until an iteratively trained transition network model satisfies the model convergence condition, and take the transition network model satisfying the model convergence condition as the target network model for performing loop recognition on the to-be-recognized video. Through the above effective evaluation of credibility of model training, model accuracy in different iteration stages can be recognized, so as to improve efficiency of the model training.

As can be seen, the computer device in an embodiment of this disclosure iterates the initial network model through the sample encoding features (e.g., the first sample encoding feature and the second sample encoding feature) of the sample video clip pair to obtain the target network model for performing loop recognition on the to-be-recognized video. Therefore, in case of a large number of to-be-recognized videos, video types of the to-be-recognized videos can be quickly determined through the target network model without manual participation in video loop recognition, so as to determine the video type of the to-be-recognized video, thereby improving efficiency of the video loop recognition. In addition, since the trained target network model is trained based on sample encoding features of different modal information, the trained target network model can make full use of the multi-modal information of the to-be-recognized video when performing loop recognition, which improves accuracy of the loop recognition. It may be understood that, since the target network model may be trained based on the sample encoding features of the sample video clip pair under different modal information, richer service expansion can be quickly supported. That is, different types of target network models can be customized according to service requirements. For example, the computer device may train a target network model that focuses on video modal information, audio modal information, and speech text modal information. In another example, the computer device may further train a target network model that focuses on audio modal information, video title modal information, and cover modal information, which is not limited herein.

Figure 9:
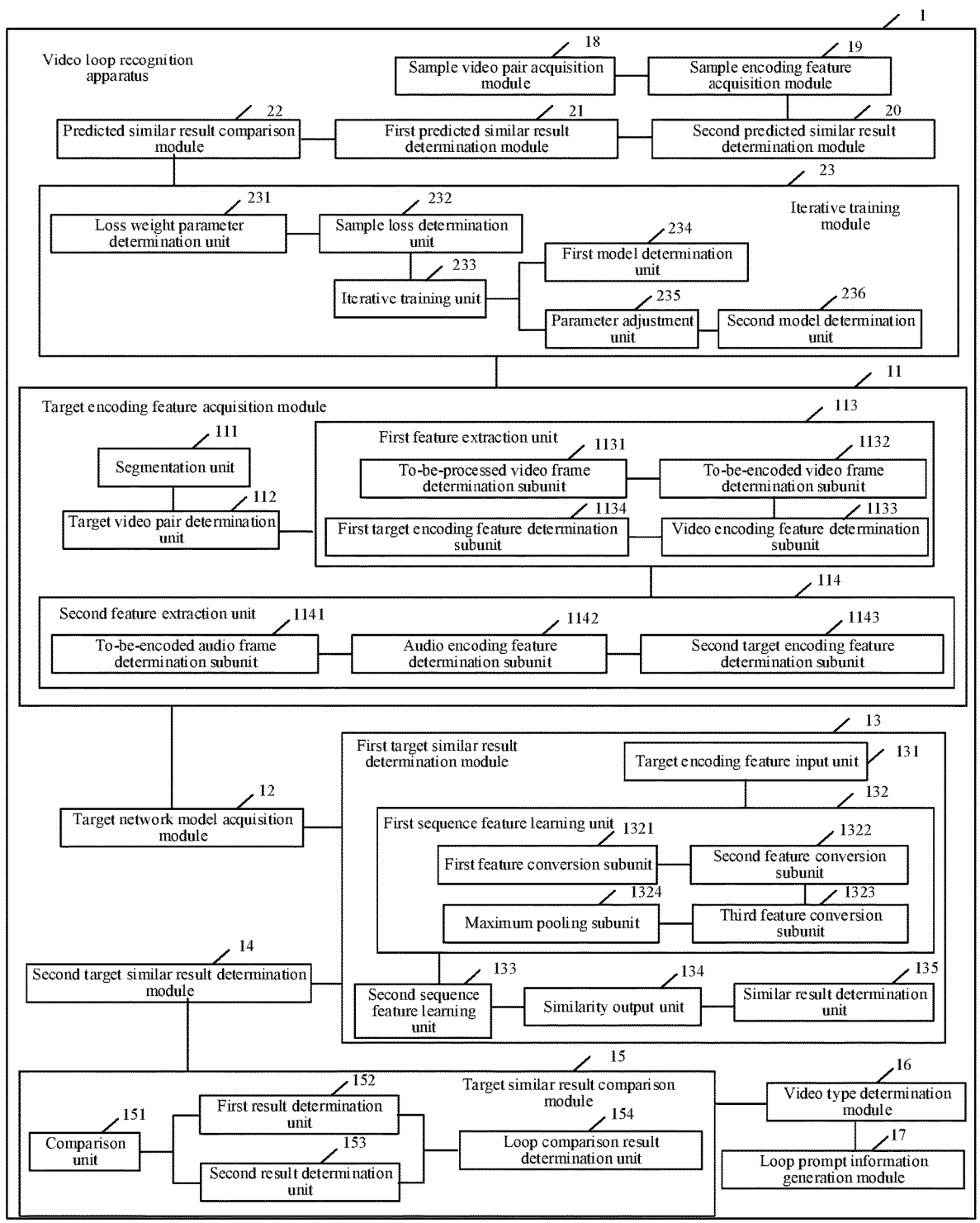
FIG. 9 is a schematic structural diagram of a video loop recognition apparatus according to an embodiment of this disclosure.

Further, referring to FIG. 9, FIG. 9 is a schematic structural diagram of a video loop recognition apparatus according to an embodiment of this disclosure. As shown in FIG. 9, the video loop recognition apparatus 1 may be a computer program (including program code) running on a computer device. For example, the video loop recognition apparatus 1 is application software. The video loop recognition apparatus 1 may be configured to corresponding steps in the methods according to the embodiments of this disclosure. As shown in FIG. 9, the video loop recognition apparatus 1 may run on a computer device with a video loop recognition function. The computer device may be the above server 10 in the embodiment corresponding to FIG. 1, or any user terminal running the target network model in the user terminal cluster in the embodiment corresponding to FIG. 1, for example, the user terminal 100a. The video loop recognition apparatus 1 may include: a target encoding feature acquisition module 11, a target network model acquisition module 12, a first target similar result determination module 13, a second target similar result determination module 14, a target similar result comparison module 15, a video type determination module 16, a loop prompt information generation module 17, a sample video pair acquisition module 18, a sample encoding feature acquisition module 19, a first predicted similar result determination module 20, a second predicted similar result determination module 21, a predicted similar result comparison module 22, and an iterative training module 23.

The target encoding feature acquisition module 11 is configured to acquire a target video clip pair of a to-be-recognized video, and determine a first target encoding feature and a second target encoding feature of the target video clip pair. First modal information corresponding to the first target encoding feature is different from second modal information corresponding to the second target encoding feature.

The target encoding feature acquisition module 11 includes: a segmentation unit 111, a target video pair determination unit 112, a first feature extraction unit 113, and a second feature extraction unit 114.

The segmentation unit 111 is configured to determine, in a case that the to-be-recognized video is acquired, a video duration of the to-be-recognized video, and segment the to-be-recognized video based on the video duration to obtain N video clips. N is a positive integer.

The target video pair determination unit 112 is configured to acquire a video clip $P_i$ and a video clip $P_j$ from the N video clips, and take the video clip $P_i$ and the video clip $P_j$ as the target video clip pair of the to-be-recognized video. i and j are positive integers less than or equal to N, and i is not equal to j.

The first feature extraction unit 113 is configured to perform first feature extraction on each video clip in the target video clip pair to obtain the first target encoding feature of the target video clip pair.

The first modal information is video modal information.

The first feature extraction unit 113 includes: a to-be-processed video frame determination subunit 1131, a to-be-encoded video frame determination subunit 1132, a video encoding feature determination subunit 1133, and a first target encoding feature determination subunit 1134.

The to-be-processed video frame determination subunit 1131 is configured to take a video frame corresponding to each video clip in the target video clip pair as a to-be-processed video frame, and determine a frame extraction parameter based on a frame rate of the to-be-processed video frame.

The to-be-encoded video frame determination subunit 1132 is configured to perform frame extraction processing on the to-be-processed video frame based on the frame extraction parameter to obtain a to-be-encoded video frame correlated with the to-be-processed video frame.

The video encoding feature determination subunit 1133 is configured to acquire a video encoding model correlated with the video modal information, input the to-be-encoded video frame to the video encoding model, and encode the to-be-encoded video frame through the video encoding model to obtain a video encoding feature corresponding to the to-be-encoded video frame.

The first target encoding feature determination subunit 1134 is configured to obtain the first target encoding feature of the target video clip pair based on the video encoding feature corresponding to the to-be-encoded video frame. The first target encoding feature includes a video encoding feature $S_i$ corresponding to the video clip $P_i$ and a video encoding feature $S_j$ corresponding to the video clip $P_j$.

Specific implementations of the to-be-processed video frame determination subunit 1131, the to-be-encoded video frame determination subunit 1132, the video encoding feature determination subunit 1133, and the first target encoding feature determination subunit 1134 may be obtained with reference to the above descriptions about the first target encoding feature in the embodiment corresponding to FIG. 3. Details are not described herein again.

The second feature extraction unit 114 is configured to perform second feature extraction on each video clip in the target video clip pair to obtain the second target encoding feature of the target video clip pair.

The second modal information is audio modal information.

The second feature extraction unit 114 includes: a to-be-encoded audio frame determination subunit 1141, an audio encoding feature determination subunit 1142, and a second target encoding feature determination subunit 1143.

The to-be-encoded audio frame determination subunit 1141 is configured to take an audio frame corresponding to each video clip in the target video clip pair as a to-be-processed audio frame, and perform audio preparation processing on the to-be-processed audio frame to obtain a to-be-encoded audio frame correlated with the to-be-processed audio frame.

The audio encoding feature determination subunit 1142 is configured to acquire an audio encoding model correlated with the audio modal information, input the to-be-encoded audio frame to the audio encoding model, and encode the to-be-encoded audio frame through the audio encoding model to obtain an audio encoding feature corresponding to the to-be-encoded audio frame.

The second target encoding feature determination subunit 1143 is configured to obtain the second target encoding feature of the target video clip pair based on the audio encoding feature corresponding to the to-be-encoded audio frame. The second target encoding feature includes an audio encoding feature $Y_i$ corresponding to the video clip $P_i$ and an audio encoding feature $Y_j$ corresponding to the video clip $P_j$.

Specific implementations of the to-be-encoded audio frame determination subunit 1141, the audio encoding feature determination subunit 1142, and the second target encoding feature determination subunit 1143 may be obtained with reference to the above descriptions about the second target encoding feature in the embodiment corresponding to FIG. 3. Details are not described herein again.

Specific implementations of the segmentation unit 111, the target video pair determination unit 112, the first feature extraction unit 113, and the second feature extraction unit 114 may be obtained with reference to the above descriptions about S101 in the embodiment corresponding to FIG. 3. Details are not described herein again.

The target network model acquisition module 12 is configured to acquire a target network model for performing loop recognition on the to-be-recognized video. The target network model includes a first target sequence model correlated with the first modal information and a second target sequence model correlated with the second modal information.

In a possible implementation, the first target sequence model may include a first sequence representation learning layer and a first similarity measurement layer. The second target sequence model includes a second sequence representation learning layer and a second similarity measurement layer.

The first target similar result determination module 13 is configured to input the first target encoding feature to the first target sequence model, and output a first target similar result of the target video clip pair.

In a possible implementation, the first target similar result determination module 13 is further configured to input the first target encoding feature to the first target sequence model, perform sequence feature learning on the first target encoding feature through the first sequence representation learning layer, input a first target learning feature obtained after sequence feature learning to the first similarity measurement layer, and output, by the first similarity measurement layer, the first target similar result of the target video clip pair.

The target video clip pair includes a video clip $P_i$ and a video clip $P_j$. i and j are positive integers less than or equal to N, and i is not equal to j. N is a total quantity of the video clips in the to-be-recognized video. The first sequence representation learning layer includes a first network layer correlated with the video clip $P_i$ and a second network layer correlated with the video clip $P_j$, and the first network layer and the second network layer have a same network structure.

The first target similar result determination module 13 includes: a target encoding feature input unit 131, a first sequence feature learning unit 132, a second sequence feature learning unit 133, a similarity output unit 134, and a similar result determination unit 135.

The target encoding feature input unit 131 is configured to input the first target encoding feature to the first target sequence model. The first target encoding feature includes a video encoding feature $S_i$ and a video encoding feature $S_j$. The video encoding feature $S_i$ is an encoding feature of the video clip $P_i$ under the first modal information. The video encoding feature $S_j$ is an encoding feature of the video clip $P_j$ under the first modal information.

The first sequence feature learning unit 132 is configured to perform sequence feature learning on the video encoding feature $S_i$ through the first network layer in the first sequence representation learning layer to obtain a learning feature $X_i$ corresponding to the video encoding feature $S_i$.

The first network layer includes a first sub-network layer, a second sub-network layer, a third sub-network layer, and a fourth sub-network layer.

The first sequence feature learning unit 132 includes: a first feature conversion subunit 1321, a second feature conversion subunit 1322, a third feature conversion subunit 1323, and a maximum pooling subunit 1324.

The first feature conversion subunit 1321 is configured to perform feature conversion on the video encoding feature $S_i$ through the first sub-network layer in the first network layer to obtain a first conversion feature corresponding to the video encoding feature $S_i$.

The first sub-network layer includes a first convolutional layer, a second convolutional layer, and a dilated convolution layer.

The first feature conversion subunit 1321 is further configured to convolve, in a case that the video encoding feature $S_i$ is inputted to the first sub-network layer in the first network layer, the video encoding feature $S_i$ through the dilated convolution layer to obtain a first convolution feature corresponding to the video encoding feature $S_i$. The first feature conversion subunit 1321 is further configured to convolve the video encoding feature $S_i$ through the first convolutional layer to obtain a second convolution feature corresponding to the video encoding feature $S_i$, input the second convolution feature to the second convolutional layer, and convolve the second convolution feature through the second convolutional layer to obtain a third convolution feature. The first feature conversion subunit 1321 is further configured to concatenate the first convolution feature and the second convolution feature to obtain the first conversion feature corresponding to the video encoding feature $S_i$.

The second feature conversion subunit 1322 is configured to input the first conversion feature to the second sub-network layer, and perform feature conversion on the first conversion feature through the second sub-network layer to obtain a second conversion feature corresponding to the first conversion feature.

The third feature conversion subunit 1323 is configured to input the second conversion feature to the third sub-network layer, and perform feature conversion on the second conversion feature through the third sub-network layer to obtain a third conversion feature corresponding to the second conversion feature.

The maximum pooling subunit 1324 is configured to input the third conversion feature to the fourth sub-network layer, and maximally pool the third conversion feature through a maximum pooling layer in the fourth sub-network layer to obtain the learning feature $X_i$ corresponding to the video encoding feature $S_i$.

Specific implementations of the first feature conversion subunit 1321, the second feature conversion subunit 1322, the third feature conversion subunit 1323, and the maximum pooling subunit 1324 may be obtained with reference to the above descriptions about the learning feature in the embodiment corresponding to FIG. 6. Details are not described herein again.

The second sequence feature learning unit 133 is configured to perform sequence feature learning on the video encoding feature $S_j$ through the second network layer in the first sequence representation learning layer to obtain a learning feature $X_j$ corresponding to the video encoding feature $S_j$.

The similarity output unit 134 is configured to take the learning feature $X_i$ and the learning feature $X_j$ as first target learning features, input the first target learning features to the first similarity measurement layer, and output, by the first similarity measurement layer, a similarity between the first target learning features.

The similar result determination unit 135 is configured to determine the first target similar result of the target video clip pair based on the similarity between the first target learning features.

Specific implementations of the target encoding feature input unit 131, the first sequence feature learning unit 132, a second sequence feature learning unit 133, the similarity output unit 134, and the similar result determination unit 135 may be obtained with reference to the above descriptions about S103 in the embodiment corresponding to FIG. 3. Details are not described herein again.

The second target similar result determination module 14 is configured to input the second target encoding feature to the second target sequence model, and output a second target similar result of the target video clip pair.

In a possible implementation, the second target similar result determination module 14 is further configured to input the second target encoding feature to the second target sequence model, perform sequence feature learning on the second target encoding feature through the second sequence representation learning layer, input a second target learning feature obtained after sequence feature learning to the second similarity measurement layer, and output, by the second similarity measurement layer, the second target similar result of the target video clip pair.

The target similar result comparison module 15 is configured to compare the first target similar result with the second target similar result to obtain a loop comparison result of the target video clip pair. The loop comparison result is used for indicating a video type of the to-be-recognized video.

The target similar result comparison module 15 includes: a comparison unit 151, a first result determination unit 152, a second result determination unit 153, and a loop comparison result determination unit 154.

The comparison unit 151 is configured to compare the first target similar result with the second target similar result.

The first result determination unit 152 is configured to obtain a loop video result of the target video clip pair in a case that the first target similar result indicates that the target video clip pair is similar under the first modal information and the second target similar result indicates that the target video clip pair is similar under the second modal information.

The second result determination unit 153 is configured to obtain a non-loop video result of the target video clip pair in a case that the first target similar result indicates that the target video clip pair is not similar under the first modal information or the second target similar result indicates that the target video clip pair is not similar under the second modal information.

The loop comparison result determination unit 154 is configured to take the loop video result or the non-loop video result as the loop comparison result of the target video clip pair.

Specific implementations of the comparison unit 151, the first result determination unit 152, the second result determination unit 153, and the loop comparison result determination unit 154 may be obtained with reference to the above descriptions about S105 in the embodiment corresponding to FIG. 3. Details are not described herein again.

The video type determination module 16 is configured to determine the video type of the to-be-recognized video to be a loop video type in a case that the loop comparison result is a loop video result.

The loop prompt information generation module 17 is configured to generate loop prompt information based on the loop video type, and return the loop prompt information to a user terminal. The user terminal is a transmitter of the to-be-recognized video.

The sample video pair acquisition module 18 is configured to acquire a sample video clip pair for training an initial network model and a sample label of the sample video clip pair. The initial network model includes a first initial sequence model and a second initial sequence model. The first initial sequence model includes the first sequence representation learning layer and the first similarity measurement layer. The second initial sequence model includes the second sequence representation learning layer and the second similarity measurement layer.

The sample encoding feature acquisition module 19 is configured to acquire a first sample encoding feature of the sample video clip pair under the first modal information and a second sample encoding feature under the second modal information respectively.

The first predicted similar result determination module 20 is configured to input the first sample encoding feature to a first initial sequence model, and output a first predicted similar result of the sample video clip pair through the first sequence representation learning layer and the first similarity measurement layer in the first initial sequence model.

The second predicted similar result determination module 21 is configured to input the second sample encoding feature to a second initial sequence model, and output a second predicted similar result of the sample video clip pair through the second sequence representation learning layer and the second similarity measurement layer in the second initial sequence model.

The predicted similar result comparison module 22 is configured to compare the first predicted similar result with the second predicted similar result to obtain a prediction label corresponding to a prediction loop result of the sample video clip pair.

The iterative training module 23 is configured to iteratively train the initial network model based on the prediction label and the sample label, and take an iteratively trained initial network model as the target network model for performing loop recognition on the to-be-recognized video.

The sample video clip pair includes a positive sample video clip pair and a negative sample video clip pair. The positive sample video clip pair is a video clip pair carrying a first sample label. The negative sample video clip pair is a video clip pair carrying a second sample label. The first sample label and the second sample label belong to the sample label. The prediction loop result includes a first prediction loop result of the positive sample video clip pair and a second prediction loop result of the negative sample video clip pair. The prediction label includes a first prediction label corresponding to the first prediction loop result and a second prediction label corresponding to the second prediction loop result.

The iterative training module 23 includes: a loss weight parameter determination unit 231, a sample loss determination unit 232, an iterative training unit 233, a first model determination unit 234, a parameter adjustment unit 235, and a second model determination unit 236.

The loss weight parameter determination unit 231 is configured to determine, based on a sample proportion between the positive sample video clip pair and the negative sample video clip pair indicated by the sample label, a loss weight parameter correlated with a model loss function of the initial network model.

The sample loss determination unit 232 is configured to obtain a positive sample loss of the positive sample video clip pair based on the first prediction label and the first sample label, and obtain a negative sample loss of the negative sample video clip pair based on the second prediction label and the second sample label.

The iterative training unit 233 is configured to obtain a model loss corresponding to the model loss function based on the positive sample loss, the negative sample loss, and the loss weight parameter, and iteratively train the initial network model based on the model loss to obtain a model training result.

The first model determination unit 234 is configured to take, in a case that the model training result indicates that the iteratively trained initial network model satisfies a model convergence condition, the initial network model satisfying the model convergence condition as the target network model for performing loop recognition on the to-be-recognized video.

The parameter adjustment unit 235 is configured to adjust, in a case that the model training result indicates that the iteratively trained initial network model does not satisfy the model convergence condition, a model parameter of the initial network model based on the model loss function not satisfying the model convergence condition.

The second model determination unit 236 is configured to take the initial network model after the adjustment of the model parameter as a transition network model, iteratively train the transition network model until an iteratively trained transition network model satisfies the model convergence condition, and take the transition network model satisfying the model convergence condition as the target network model for performing loop recognition on the to-be-recognized video.

Specific implementations of the loss weight parameter determination unit 231, the sample loss determination unit 232, the iterative training unit 233, the first model determination unit 234, the parameter adjustment unit 235, and the second model determination unit 236 may be obtained with reference to the above descriptions about S211 in the embodiment corresponding to FIG. 7. Details are not described herein again.

Specific implementations of the target encoding feature acquisition module 11, the target network model acquisition module 12, the first target similar result determination module 13, the second target similar result determination module 14, the target similar result comparison module 15, the video type determination module 16, the loop prompt information generation module 17, the sample video pair acquisition module 18, the sample encoding feature acquisition module 19, the first predicted similar result determination module 20, the second predicted similar result determination module 21, the predicted similar result comparison module 22, and the iterative training module 23 may be obtained with reference to the above descriptions about S201 to S211 in the embodiment corresponding to FIG. 7. Details are not described herein again. In addition, the description of beneficial effects of the same method is not described herein again.

Figure 10:
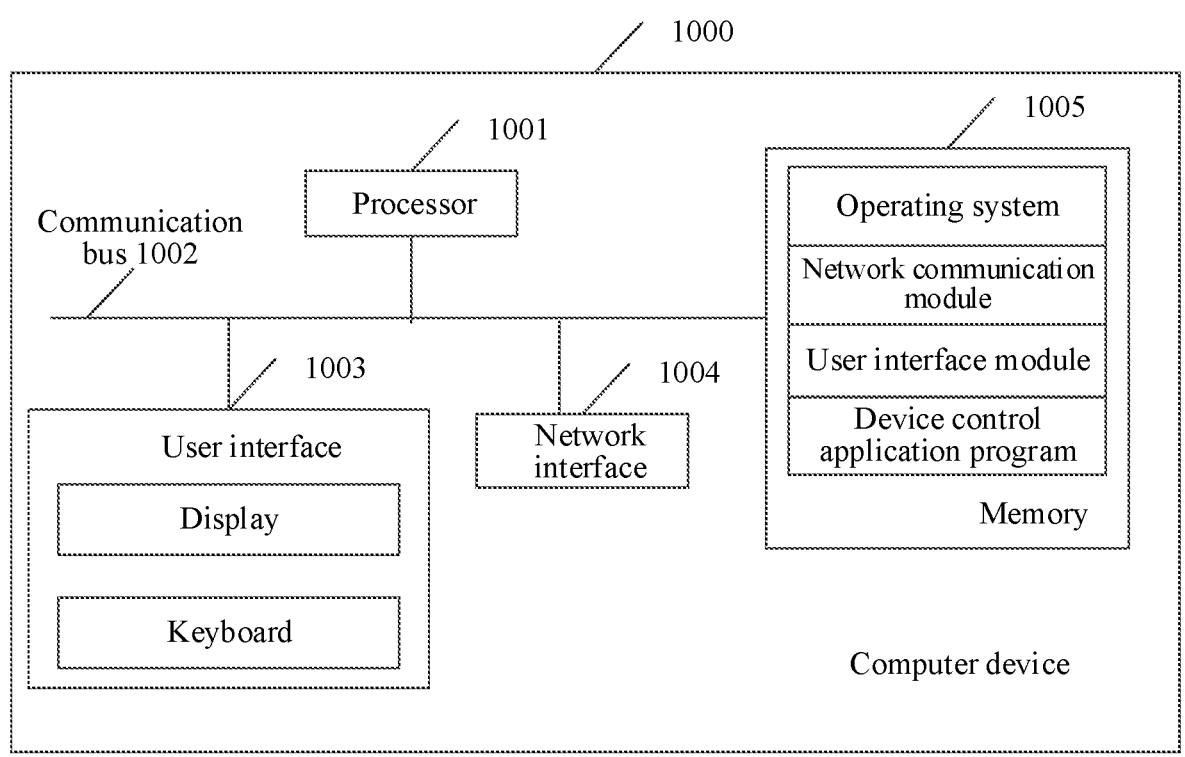
FIG. 10 is a schematic diagram of a computer device according to an embodiment of this disclosure.

Further, referring to FIG. 10, FIG. 10 is a schematic diagram of a computer device according to an embodiment of this disclosure. As shown in FIG. 10, the computer device 1000 may be a computer device with a video loop recognition function. The computer device 1000 may include: at least one processor 1001, for example, a CPU, at least one network interface 1004, a memory 1005, and at least one communication bus 1002. The communication bus 1002 is configured to implement connection and communication between the components. In some examples, the network interface 1004 may comprise a standard wired interface and a standard wireless interface (such as a WI-FI interface). The memory 1005 may be a high-speed random access memory (RAM), or may be a non-volatile memory, for example, at least one magnetic disk memory. In some examples, the memory 1005 may further be at least one storage apparatus away from the foregoing processor 1001. As shown in FIG. 10, the memory 1005 used as a computer storage medium may include an operating system, a network communication module, a user interface module, and a device-control application program. In some embodiments, the computer device may further include a user interface 1003 shown in FIG. 10. For example, if the computer device is the user terminal with the video loop recognition function shown in FIG. 1 (e.g., the user terminal 100a), the computer device may further include the user interface 1003. The user interface 1003 may include a display, a keyboard, and the like.

In the computer device 1000 shown in FIG. 10, the network interface 1004 is mainly configured for network communication. The user interface 1003 is mainly configured to provide an input interface for a user. The processor 1001 may be configured to invoke a device control application program stored in the memory 1005 to perform acquire a target video clip pair of a to-be-recognized video, and determine a first target encoding feature and a second target encoding feature of the target video clip pair; first modal information corresponding to the first target encoding feature being different from second modal information corresponding to the second target encoding feature; acquire a target network model for performing loop recognition on the to-be-recognized video; the target network model including a first target sequence model correlated with the first modal information and a second target sequence model correlated with the second modal information; input the first target encoding feature to the first target sequence model, and output a first target similar result of the target video clip pair; input the second target encoding feature to the second target sequence model, and output a second target similar result of the target video clip pair; and compare the first target similar result with the second target similar result to obtain a loop comparison result of the target video clip pair; the loop comparison result being used for indicating a video type of the to-be-recognized video.

It is to be understood that the computer device 1000 described in an embodiment of this disclosure can implement the descriptions of the video loop recognition method in the foregoing embodiment corresponding to FIG. 3 and FIG. 7, and can also implement the descriptions of the video loop recognition apparatus 1 in the foregoing embodiment corresponding to FIG. 9. Details are not described herein again. In addition, the description of beneficial effects of the same method is not described herein again.

The embodiment of this disclosure further provides a computer-readable storage medium (e.g., a non-transitory computer-readable storage medium), the computer-readable storage medium storing a computer program, the computer program comprising program instructions, the program instructions, when executed by a processor, performing the fixed-point to the video loop recognition method provided by each step in FIG. 3 and FIG. 7. For a specific implementation, refer to the steps in FIG. 3 and FIG. 7. Details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The computer-readable storage medium may be a data transmission apparatus provided in any one of the foregoing embodiments or an internal storage unit of the computer device, for example, a hard disk or a main memory of the terminal. The computer-readable storage medium may alternatively be an external storage device of the computer device, for example, a removable hard disk, a smart memory card (SMC), a secure digital (SD) card, or a flash card equipped on the computer device. Further, the computer-readable storage medium may further include both an internal storage unit and an external storage device of the computer device. The computer-readable storage medium is configured to store the computer program and another program and data that are required by the computer device. The computer-readable storage medium may further be configured to temporarily store data that has been output or data to be output.

According to an aspect in this disclosure, a computer program product or a computer program is provided, comprising computer instructions, the computer instructions being stored in a computer-readable storage medium. A processor of a computer device reads the computer instructions from the computer-readable storage medium, and executes the descriptions of the video loop recognition method in the embodiments corresponding to FIG. 3 or FIG. 7. Details are not described herein again. In addition, the description of beneficial effects of the same method is not described herein again.

In the specification, claims, and accompanying drawings of embodiments of this disclosure, the terms "first" and "second" are intended to distinguish between different objects but do not indicate a particular order. In addition, terminologies "comprise" and any variations thereof are intended to indicate non-exclusive inclusion. For example, a process, method, apparatus, product, or device that comprises a series of steps or modules is not limited to the listed steps or units; and instead, further comprises a step or module that is not listed, or further comprises another step or unit that is intrinsic to the process, method, apparatus, product, or device.

It is noted that, in combination with examples of units and algorithm steps described in the embodiments disclosed in the present disclosure, this disclosure may be implemented by using electronic hardware, computer software, or a combination thereof. To describe interchangeability between the hardware and the software, compositions and steps of each example have been generally described according to functions in the foregoing descriptions. Whether the functions are executed in a mode of hardware or software depends on particular applications and design constraint conditions of the technical solutions. It is also noted that different methods can be used to implement the described functions for each particular application, the implementation by the different methods may still within the scope of this disclosure.

The method and the related apparatus provided in embodiments of this disclosure are described with reference to method flowcharts and/or schematic structural diagrams provided in the embodiments of this disclosure. Specifically, computer program instructions may be used to implement each process and/or each block in the method flowcharts and/or the schematic structural diagrams and a combination of a process and/or a block in the flowcharts and/or the block diagrams. These computer program instructions may be provided to a general-purpose computer, a dedicated computer, an embedded processor, or a processor of another programmable video loop recognition apparatus to generate a machine, so that the instructions executed by the computer or the processor of the another programmable video loop recognition apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable video loop recognition device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer program instructions may also be loaded onto a computer or another programmable video loop recognition device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this disclosure, and is not intended to limit the scope of this disclosure. Therefore, equivalent variations made in accordance with the claims of this disclosure shall fall within the scope of this disclosure.

What is claimed is:

1. A method for video loop recognition, comprising:
acquiring a first video clip pair from a video, the first video clip pair comprising a first video clip and a second video clip from the video, the first video clip and the second video clip being from different time intervals of the video;
determining a first encoding feature from the first video clip pair, the first encoding feature being associated with first modal information;
determining a second encoding feature from the first video clip pair, the second encoding feature being associated with second modal information that is different from the first modal information, each of the first modal information and the second modal information being selected from video modal information, audio modal information, speech text modal information, video title modal information, and cover modal information;

acquiring a multi-modal neural network model that performs a loop recognition on the video, the multi-modal neural network model comprising a first sequence model associated with the first modal information and a second sequence model associated with the second modal information;

inputting the first encoding feature to the first sequence model that outputs a first similarity result for the first video clip pair;

inputting the second encoding feature to the second sequence model that outputs a second similarity result for the first video clip pair; and obtaining a loop comparison result of the first video clip pair based on a comparison of the first similarity result with the second similarity result, the loop comparison result indicating a video type of the video.

2. The method according to claim 1, wherein the first sequence model comprises a first sequence representation learning layer and a first similarity measurement layer; the second sequence model comprises a second sequence representation learning layer and a second similarity measurement layer;

the inputting the first encoding feature to the first sequence model comprises:
performing a first sequence feature learning on the first encoding feature through the first sequence representation learning layer to obtain a first learning feature, and
inputting the first learning feature to the first similarity measurement layer to obtain the first similarity result of the first video clip pair; and the inputting the second encoding feature to the second sequence model comprises:
performing a second sequence feature learning on the second encoding feature through the second sequence representation learning layer to obtain a second learning feature, and
inputting the second learning feature to the second similarity measurement layer to obtain the second similarity result of the first video clip pair.

3. The method according to claim 2, wherein N is a total quantity of video clips in the video, the first video clip pair comprises a video clip $P_i$ and a video clip $P_j$, i and j being positive integers less than or equal to N, and i not being equal to j; the first sequence representation learning layer comprises a first network layer associated with the video clip $P_i$ and a second network layer associated with the video clip $P_j$, and the first network layer and the second network layer have a same network structure; the first encoding feature comprises a video encoding feature $S_i$ and a video encoding feature $S_j$, the video encoding feature $S_i$ is an encoding feature of the video clip $P_i$ under the first modal information, and the video encoding feature $S_j$ is an encoding feature of the video clip $P_j$ under the first modal information; and the performing the first sequence feature learning comprises:
performing a first portion of the first sequence feature learning on the video encoding feature $S_i$ through the first network layer in the first sequence representation learning layer to obtain a learning feature $X_i$ corresponding to the video encoding feature $S_i$;
performing a second portion of the first sequence feature learning on the video encoding feature $S_j$ through the second network layer in the first sequence representation learning layer to obtain a learning feature $X_j$ corresponding to the video encoding feature $S_j$; and
combining the learning feature $X_i$ and the learning feature $X_j$ as the first learning feature.

4. The method according to claim 3, wherein the first network layer comprises a first sub-network layer, a second sub-network layer, a third sub-network layer, and a fourth sub-network layer; and the performing the first portion of the first sequence feature learning comprises:
performing a first feature conversion on the video encoding feature $S_i$ through the first sub-network layer in the first network layer to obtain a first conversion feature corresponding to the video encoding feature $S_i$;
performing a second feature conversion on the first conversion feature through the second sub-network layer to obtain a second conversion feature corresponding to the first conversion feature;
performing a third feature conversion on the second conversion feature through the third sub-network layer to obtain a third conversion feature corresponding to the second conversion feature;
inputting the third conversion feature to the fourth sub-network layer; and
maximally pooling the third conversion feature through a maximum pooling layer in the fourth sub-network layer to obtain the learning feature $X_i$ corresponding to the video encoding feature $S_i$.

5. The method according to claim 4, wherein the first sub-network layer comprises a first convolutional layer, a second convolutional layer, and a dilated convolution layer; and the performing the first feature conversion comprises:
convolving, when the video encoding feature $S_i$ is inputted to the first sub-network layer in the first network layer, the video encoding feature $S_i$ through the dilated convolution layer to obtain a first convolution feature corresponding to the video encoding feature $S_i$;
convolving the video encoding feature $S_i$ through the first convolutional layer to obtain a second convolution feature corresponding to the video encoding feature $S_i$;
convolving the second convolution feature through the second convolutional layer to obtain a third convolution feature; and
concatenating the first convolution feature and the second convolution feature to obtain the first conversion feature corresponding to the video encoding feature $S_i$.

6. The method according to claim 2, further comprising:
acquiring a sample video clip pair for training an initial network model and a sample label of the sample video clip pair, the initial network model comprising a first initial sequence model and a second initial sequence model, the first initial sequence model comprising the first sequence representation learning layer and the first similarity measurement layer; the second initial sequence model comprising the second sequence representation learning layer and the second similarity measurement layer;
acquiring a first sample encoding feature of the sample video clip pair under the first modal information and a second sample encoding feature under the second modal information respectively;

inputting the first sample encoding feature to the first initial sequence model that outputs a first predicted similarity result of the sample video clip pair;

inputting the second sample encoding feature to the second initial sequence model that outputs a second predicted similarity result of the sample video clip pair;

obtaining a prediction label corresponding to a prediction loop result of the sample video clip pair based on a comparison of the first predicted similarity result and the second predicted similarity result; and iteratively training the initial network model based on the prediction label and the sample label to obtain a trained network model as the multi-modal neural network model for performing the loop recognition on the video.

7. The method according to claim 6, further comprising:

preparing a first plurality of positive sample video clip pairs and a second plurality of negative sample video clip pairs, the first plurality of positive sample video clip pairs having a positive sample label, the second plurality of negative sample video clip pairs having a negative sample label;

applying the initial network model on the first plurality of positive sample video clip pairs to obtain first prediction labels corresponding to first prediction loop results from the initial network model;

applying the initial network model on the second plurality of negative sample video clip pairs to obtain second prediction labels corresponding to second prediction loop results from the initial network model;

determining, based on a sample proportion between the first plurality of positive sample video clip pairs and the second plurality of negative sample video clip pairs, a loss weight parameter correlated with a model loss function of the initial network model;

obtaining a positive sample loss of the first plurality of positive sample video clip pairs based on the first prediction labels and the positive sample label;

obtaining a negative sample loss of the second plurality of negative sample video clip pairs based on the second prediction labels and the negative sample label;

obtaining a model loss corresponding to the model loss function based on the positive sample loss, the negative sample loss, and the loss weight parameter;

iteratively training the initial network model based on the model loss to obtain a model training result; and when the model training result indicates that the iteratively trained initial network model satisfies a model convergence condition, outputting the iteratively trained initial network model that satisfies the model convergence condition as the multi-modal neural network model for performing the loop recognition on the video.

8. The method according to claim 7, further comprising:

adjusting, when the model training result indicates that the iteratively trained initial network model does not satisfy the model convergence condition, a model parameter of the initial network model based on the model loss function that does not satisfy the model convergence condition to obtain a transition network model;

iteratively training the transition network model until an iteratively trained transition network model satisfies the model convergence condition; and determining the iteratively trained transition network model satisfying the model convergence condition as the multi-modal neural network model for performing the loop recognition on the video.

9. The method according to claim 1, wherein the acquiring the first video clip pair of the video comprises:

determining a video clip duration for segmenting the video;

segmenting the video based on the video clip duration to obtain N video clips, N being a positive integer, the N video clips comprising the first video clip and the second video clip;

forming a plurality of video clip pairs from the N video clips, a video clip pair from the plurality of video clip pairs comprising a video clip $P_i$ and a video clip $P_j$ from the N video clips, i and j being positive integers less than or equal to N, and i not being equal to j, the plurality of video clip pairs comprising the first video clip pair;

performing first feature extractions on the plurality of video clip pairs to obtain first encoding features of the plurality of video clip pairs; and performing second feature extractions on the plurality of video clip pairs to obtain second encoding features of the plurality of video clip pairs.

10. The method according to claim 9, wherein the first modal information is the video modal information; and the performing the first feature extractions comprises:

performing frame extraction processing operations on the N video clips based on a frame extraction parameter to obtain N subsets of video frames associated with the N video clips;

acquiring a video encoding model associated with the video modal information;

encoding the N subsets of video frames through the video encoding model to obtain video encoding features corresponding to the N subsets of video frames; and obtaining first encoding features of the plurality of video clip pairs based on the video encoding features corresponding to the N subsets of video frames, a specific first encoding feature for the video clip pair having the video clip $P_i$ and the video clip $P_j$ comprising a video encoding feature $S_i$ corresponding to the video clip $P_i$ and a video encoding feature $S_j$ corresponding to the video clip $P_j$.

11. The method according to claim 9, wherein the second modal information is the audio modal information; and the performing the second feature extractions comprises:

performing audio preparation processing operations on audio frames from the N video clips to obtain prepared audio frames;

acquiring an audio encoding model associated with the audio modal information;

encoding the prepared audio frames through the audio encoding model to obtain audio encoding features corresponding to the prepared audio frames; and obtaining the second encoding features of the plurality of video clip pairs based on the audio encoding features corresponding to the prepared audio frames, a specific second encoding feature for the video clip pair having the video clip $P_i$ and the video clip $P_j$ comprising an audio encoding feature $Y_i$ corresponding to the video clip $P_i$ and an audio encoding feature $Y_j$ corresponding to the video clip $P_j$.

12. The method according to claim 1, wherein the obtaining the loop comparison result of the first video clip pair comprises:

obtaining a loop video result of the first video clip pair when the first similarity result indicates that the first video clip pair is similar under the first modal information and the second similarity result indicates that the first video clip pair is similar under the second modal information; and obtaining a non-loop video result of the first video clip pair when the first similarity result indicates that the first video clip pair is not similar under the first modal information or the second similarity result indicates that the first video clip pair is not similar under the second modal information.

13. The method according to claim 1, further comprising:
determining the video type of the video to be a loop video type when the loop comparison result is a loop video result;
generating loop prompt information based on the loop video type; and
sending the loop prompt information to a user terminal, the user terminal being a transmitter of the video.

14. An apparatus for video loop recognition, comprising processing circuitry configured to:
acquire a first video clip pair from a video, the first video clip pair including a first video clip and a second video clip from the video, the first video clip and the second video clip being from different time intervals of the video;
determine a first encoding feature from the first video clip pair, the first encoding feature being associated with first modal information;
determine a second encoding feature from the first video clip pair, the second encoding feature being associated with second modal information that is different from the first modal information, each of the first modal information and the second modal information being selected from video modal information, audio modal information, speech text modal information, video title modal information, and cover modal information;
acquire a multi-modal neural network model that performs a loop recognition on the video, the multi-modal neural network model comprising a first sequence model associated with the first modal information and a second sequence model associated with the second modal information;
input the first encoding feature to the first sequence model that outputs a first similarity result for the first video clip pair;
input the second encoding feature to the second sequence model that outputs a second similarity result for the first video clip pair; and
obtain a loop comparison result of the first video clip pair based on a comparison of the first similarity result with the second similarity result, the loop comparison result indicating a video type of the video.

15. The apparatus according to claim 14, wherein the first sequence model comprises a first sequence representation learning layer and a first similarity measurement layer; the second sequence model comprises a second sequence representation learning layer and a second similarity measurement layer; and the processing circuitry is configured to:
perform a first sequence feature learning on the first encoding feature through the first sequence representation learning layer to obtain a first learning feature;
input the first learning feature to the first similarity measurement layer to obtain the first similarity result of the first video clip pair;

perform a second sequence feature learning on the second encoding feature through the second sequence representation learning layer to obtain a second learning feature; and
input the second learning feature to the second similarity measurement layer to obtain the second similarity result of the first video clip pair.

16. The apparatus according to claim 15, wherein N is a total quantity of video clips in the video, the first video clip pair comprises a video clip $P_i$ and a video clip $P_j$; i and j being positive integers less than or equal to N, and i not being equal to j; the first sequence representation learning layer comprises a first network layer associated with the video clip $P_i$ and a second network layer associated with the video clip $P_j$, and the first network layer and the second network layer have a same network structure; the first encoding feature comprises a video encoding feature $S_i$ and a video encoding feature $S_j$; the video encoding feature $S_i$ is an encoding feature of the video clip $P_i$ under the first modal information; the video encoding feature $S_j$ is an encoding feature of the video clip $P_j$ under the first modal information; and the processing circuitry is configured to:
perform a first portion of the first sequence feature learning on the video encoding feature $S_i$ through the first network layer in the first sequence representation learning layer to obtain a learning feature $X_i$ corresponding to the video encoding feature $S_i$;
perform a second portion of the first sequence feature learning on the video encoding feature $S_j$ through the second network layer in the first sequence representation learning layer to obtain a learning feature $X_j$ corresponding to the video encoding feature $S_j$; and
combine the learning feature $X_i$ and the learning feature $X_j$ as the first learning feature.

17. The apparatus according to claim 16, wherein the first network layer comprises a first sub-network layer, a second sub-network layer, a third sub-network layer, and a fourth sub-network layer; and the processing circuitry is configured to:
perform a first feature conversion on the video encoding feature $S_i$ through the first sub-network layer in the first network layer to obtain a first conversion feature corresponding to the video encoding feature $S_i$;
perform a second feature conversion on the first conversion feature through the second sub-network layer to obtain a second conversion feature corresponding to the first conversion feature;
perform a third feature conversion on the second conversion feature through the third sub-network layer to obtain a third conversion feature corresponding to the second conversion feature;
input the third conversion feature to the fourth sub-network layer; and
maximally pool the third conversion feature through a maximum pooling layer in the fourth sub-network layer to obtain the learning feature $X_i$ corresponding to the video encoding feature $S_i$.

18. The apparatus according to claim 14, wherein the processing circuitry is configured to:
determine a video clip duration for segmenting the video;
segment the video based on the video clip duration to obtain N video clips, N being a positive integer, the N video clips comprising the first video clip and the second video clip;
form a plurality of video clip pairs from the N video clips, a video clip pair from the plurality of video clip pairs comprising a video clip $P_i$ and a video clip $P_j$ from the N video clips, i and j being positive integers less than or equal to N, and i not being equal to j, the plurality of video clip pairs comprising the first video clip pair;

perform first feature extractions on the plurality of video clip pairs to obtain first encoding features of the plurality of video clip pairs; and perform second feature extractions on the plurality of video clip pairs to obtain second encoding features of the plurality of video clip pairs.

19. The apparatus according to claim 18, wherein the first modal information is the video modal information, and the processing circuitry is configured to:

perform frame extraction processing operations on the N video clips based on a frame extraction parameter to obtain N subsets of video frames associated with the N video clips;

acquire a video encoding model associated with the video modal information;

encode the N subsets of video frames through the video encoding model to obtain video encoding features corresponding to the N subsets of video frames; and obtain first encoding features of the plurality of video clip pairs based on the video encoding features corresponding to the N subsets of video frames, a specific first encoding feature for the video clip pair having the video clip $P_i$ and the video clip $P_j$ comprising a video encoding feature $S_i$ corresponding to the video clip $P_i$ and a video encoding feature $S_j$ corresponding to the video clip $P_j$.

20. The apparatus according to claim 18, wherein the second modal information is the audio modal information, and the processing circuitry is configured to:

perform audio preparation processing operations on audio frames from the N video clips to obtain prepared audio frames;

acquire an audio encoding model associated with the audio modal information;

encode the prepared audio frames through the audio encoding model to obtain audio encoding features corresponding to the prepared audio frames; and obtain the second encoding features of the plurality of video clip pairs based on the audio encoding features corresponding to the prepared audio frames; a specific second encoding feature for the video clip pair having the video clip $P_i$ and the video clip $P_j$ comprising an audio encoding feature $Y_i$ corresponding to the video clip $P_i$ and an audio encoding feature $Y_j$ corresponding to the video clip $P_j$.

* * * * *